United States Patent [19]
Inaji et al.

[11] Patent Number: 5,378,976
[45] Date of Patent: Jan. 3, 1995

[54] BRUSHLESS DC MOTOR WITHOUT A POSITION SENSOR

[75] Inventors: Toshio Inaji, Minoo; Eiji Ueda, Katano, both of Japan

[73] Assignee: Matsushita Electric Industries Co., Ltd., Osaka, Japan

[21] Appl. No.: 45,104

[22] Filed: Apr. 12, 1993

[30] Foreign Application Priority Data

Apr. 10, 1992 [JP] Japan .................. 4-090549
Oct. 9, 1992 [JP] Japan .................. 4-271342

[51] Int. Cl.⁶ .................................. H02P 5/40
[52] U.S. Cl. .................................. 318/810; 318/254
[58] Field of Search ........... 318/254, 138, 565, 723, 318/727, 114, 603, 609, 608, 803, 807, 810

[56] References Cited

U.S. PATENT DOCUMENTS

| | | | |
|---|---|---|---|
| 3,872,369 | 3/1975 | Rich | 318/608 |
| 3,996,454 | 12/1976 | Froyd | 318/565 |
| 4,529,922 | 7/1985 | Ono | 318/603 |
| 5,013,982 | 5/1991 | Sasaki | 318/114 |
| 5,130,620 | 7/1992 | Inaji et al. | 318/254 |
| 5,140,245 | 8/1992 | Stacey | 318/723 |
| 5,225,759 | 7/1993 | Endo et al. | 318/254 |

FOREIGN PATENT DOCUMENTS 0313046 4/1989 European Pat. Off. .
63-262088 10/1988 Japan .

Primary Examiner—William M. Shoop, Jr.
Assistant Examiner—John W. Cabeca
Attorney, Agent, or Firm—Wenderoth, Lind & Ponack

[57] ABSTRACT

A brushless DC motor detects a positional relationship between the rotor and the stator windings in a short period of time when starting the motor and immediately switches the mode from a phase coincidence mode at the time of starting to a normal position detecting mode performed by counting output pulses in response to the rotational speed of the rotor. The motor detects a position of the rotor at an extremely high accuracy independently of the magnitude of the load even when the motor has already been subjected to the application of such a load at the time of starting. The motor is always driven at a high efficiency by applying a phase correction process so as to cause the phase of each of the voltages respectively induced in the stator windings to coincide with the corresponding one of the driving currents respectively outputted to the stator windings when the motor is being rotated normally.

25 Claims, 15 Drawing Sheets

BRUSHLESS DC MOTOR WITHOUT A POSITION SENSOR

BACKGROUND OF THE INVENTION

1. Field of the Invention

This invention relates to a brushless DC motor which does not have a position sensor for detecting a rotational position of a permanent magnet rotor.

2. Description of the Prior Art

Brushless DC motors have a longer service life and less noise generation for the reason that they do not need to have a mechanical contact as would be used in conventional DC motors having brushes. As a result, they have been widely used recently in industrial or audio and video equipment requiring higher reliability.

In order to perform the switching operation of a conducting phase of the stator windings of a motor, most of conventional brushless DC motors use a rotor position sensor (such as, for example, a Hall Effect sensor) instead of brushes. However, the rotor position sensor is not cheap, and it requires a sophisticated positional adjustment for setting and an increased amount of wirings, so that cost of the brushless DC motors is large as compared with DC motors having brushes. Besides, some structural limitations will be frequently imposed thereupon for the reason that a rotor position sensor has to be set inside the motor itself. A recent trend is that accompanied with the miniaturization of industrial or audio and video equipment, motors must be made small in size and thickness, which means that the sectional space where a motor position sensor, such as a Hall Effect sensor, is located becomes extremely small. Accordingly, several types of brushless DC motors having no position sensor, such as, for example, a Hall Effect sensor, have been previously proposed. Out of which, a known brushless DC motor uses an output pulse of a frequency generator fixed to a motor. This motor counts an output pulse of the frequency generator which generates a pulse in response to the rotation of the rotor by a counter circuit and outputs a preset driving current, having a current pattern in response to the count value thus obtained, to the three-phase stator windings of the rotor in a successive manner, thereby rotating the permanent magnet rotor (see, for example, Japanese Laid-Open Patent Application No. 63-262088).

With the structure as explained above, the initial position of the rotor when starting cannot be found. As a result, the conventional brushless DC motor as shown above has a rest generating circuit for to resetting the counter using a reset signal when starting and for supplying a specific reset signal simultaneously to the stator windings of the rotor, whereby the rotor and the stator windings are placed in a predetermined positional relationship to each other in advance.

However, if the specific reset current is supplied to the stator windings in order to determine the initial position, the rotor starts to rotate and the position of the rotor vibrates around the predetermined position, so that it is impossible to stabilize the rotor at its predetermined position in a short period of time. As a result, it is impossible to shift the mode in a short period of time from the reset mode in which the specific reset current is supplied to the stator windings to stabilize the rotor to the predetermined position when starting to the normal position detecting mode in which an output pulse of the frequency generator is counted in response to the rotation of the rotor. Thus, there arises a problem in that the starting time becomes long.

This means that a conventional brushless DC motor cannot be used in an application in which the motor rotates and stops frequently and starts up in a short period of time.

In addition, with the conventional brushless DC motor as explained above, the initial position of the rotor is detected when starting, so that even if the rotor and stator windings are placed in a predetermined positional relationship to each other by supplying the reset current to the stator windings, when 1a load is applied to the rotor, the positional relationship between the rotor and stator windings will be largely varied depending on the magnitude of the load thus applied. As a result, it becomes impossible to stabilize the rotor at the predetermined position in the reset mode.

Accordingly, with the conventional brushless DC motor as shown above, if the mode is shifted from the reset mode to the normal position detection mode for counting the output pulse of the frequency generator in response to the rotation of the rotor, the phase of a current supplied to the stator windings is largely deviated from the normal phase, resulting in it being impossible to realize a highly efficient drive.

As a result, a conventional brushless DC motor is disadvantageous in that it can be used only in such an application that the motor itself is unloaded when starting.

In addition, with the brushless DC motor in which, as shown above, a output pulse of the frequency generator for generating a pulse in response to the rotation of the rotor is counted by the counter circuit and a driving current is output to the three-phase stator windings in a successive manner in response to the count value thus obtained so as to thereby rotate the permanent magnet rotor, the count value obtained by the counter circuit will be erroneous if the output of the frequency generator has noise overlapped for any reason during continuous driving, and such a count error thus generated leads to a reduction in efficiency of the motor and an increase in torque ripple. In addition, the accumulation of such count errors may cause the motor to stop in the worst case, which means that the conventional brushless DC motor as shown above lacks reliability.

SUMMARY OF THE INVENTION

An object of this invention is to provide a brushless DC motor which is capable of detecting a positional relationship between the rotor and the stator windings in a short period of time when starting the motor and which is capable of immediately switching the mode from a phase coincidence mode at the time of starting to a normal position detecting mode performed by counting output pulses in response to a rotational speed of the rotor.

Another object of this invention is to provide a brushless DC motor which is capable of detecting a position of the rotor at an extremely high accuracy independently of the magnitude of a load even when the motor is already being subjected to an application of such a load at the time of starting.

Still another object of this invention is to provide a brushless DC motor which is capable of being always driven at a high efficiency by applying a phase correction process so as to cause the phase of each of the voltages induced respectively in the stator windings with the corresponding one of the driving currents conducted respectively to the stator windings when the motor is being rotated normally.

In order to attain the above-mentioned objects, a brushless DC motor of this invention comprises: a frequency generator for generating plural-phase frequency signals each having a frequency proportional to a rotational speed of a permanent magnet rotor; a direction detecting circuit for detecting a rotational direction of the permanent magnet rotor from the plural-phase frequency signals to obtain a direction signal; a counting circuit for up-counting or down-counting pulses of at least one frequency signal of the plural-phase frequency signals in response to the direction signal; a waveform generating circuit for generating plural-phase waveform signals in response to a count value of the counting circuit; a power supply circuit for supplying power respectively to the stator windings in response to the plural-phase waveform signals. An initial position detecting circuit is provided for detecting an initial position of a magnetic pole of the permanent magnet rotor by rotating a rotating magnetic field clockwise or counterclockwise. A phase detecting circuit is provided for detecting the phases of respective driving currents outputted to the plural-phase stator windings or the phases of respective induced voltages induced in the stator windings. A phase adjusting circuit is provided for shifting the phase of the rotating magnetic field by a predetermined value clockwise or counterclockwise from the initial position thereof in response to a rotational direction command so as to thereby correct the phases of respective driving currents outputted to the stator windings and the phases of respective induced voltages induced in the stator windings in response to an output of the phase detecting circuit. When starting the motor, by rotating the rotating magnetic field generated in the stator windings clockwise or counterclockwise, the initial phase of the permanent magnet rotor is made to coincide therewith, and when rotating the rotor normally, the phases of respective driving currents outputted to the stator windings and the phases of respective induce voltages induce in the stator windings are corrected so as to be always coincident with each other.

With the structure as shown above, the brushless DC motor of this invention counts output pulses outputted from the frequency generator by the counting circuit. The position signal is formed based on the count value thus obtained and as a result, it does not need to use the position sensor required by a conventional brushless DC motor. Consequently, it becomes possible to eliminate a sophisticated setting position adjustment of the sensor as well as to reduce the amount of wiring, resulting in a vast reduction in cost. In addition, since it is unnecessary to provide a rotor position sensor in the motor, no structural limitation can be imposed thereupon, thus making it possible for the motor to be small in size and thickness.

In addition, the driving currents inputted respectively to the stator windings and the induced voltages induced respectively in the stator windings are subjected to correction so as to be always coincident in phase with each other, which means that the motor can be driven at a high efficiency.

DESCRIPTION OF THE PREFERRED EMBODIMENTS

Figure 1:
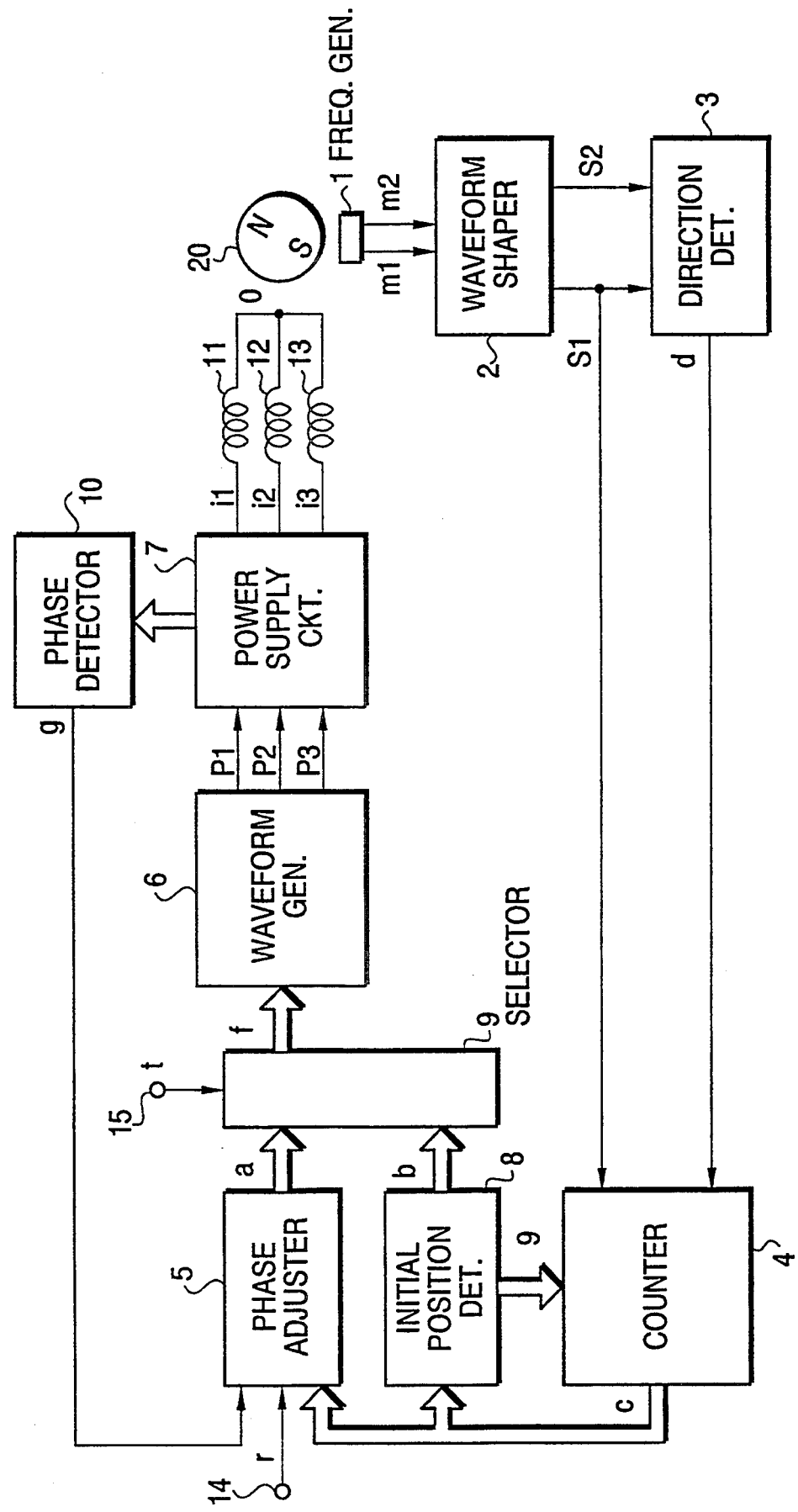
FIG. 1 is a block diagram of a brushless DC motor according to one embodiment of this invention.

FIG. 1 is a block digram of a brushless DC motor according to one embodiment of this invention. In FIG. 1, element 20 is a permanent magnet rotor; element 11, 12 and 13 and three-phase stator windings and element 1 is a frequency generator which generates two-phase frequency signals m1 and m2 different in phase from each other in proportion to the rotation of the permanent magnet rotor 20. The two-phase frequency signals m1 and m2 are sent to a waveform shaping circuit 2 to be converted respectively into rectangular wave signals s1 and s2 and then, inputted to a direction detecting circuit 3. The direction detecting circuit 3 outputs a direction signal d in response to the rotational direction normal or opposite to that of the permanent magnet rotor 20. In addition, element 4 is a counting circuit which receives the rectangular wave signal s1 outputted from the waveform shaping circuit 2 and the direction signal d outputted from the direction detecting circuit 3 so as to thereby to count-up or count-down the number of pulses of the rectangular wave signal s1 generated through the waveform shaping circuit 3 and proportional to the rotation of the permanent magnet rotor 20 in response to the rotational direction thereof, and element 8 is an initial position detecting circuit which receives a count value c of the counter 4 to determine the initial position of the permanent magnet rotor by rotating the rotating magnetic field that the stator generates in the normal or opposite direction when the phases are coincident with each other and outputs an initial value q to the counting circuit 4. The initial position detecting circuit 8 also outputs an address command signal b to a selecting circuit 9 simultaneously when the phases are coincident with each other. A phase detecting circuit 10 compares the magnitudes of the three-phase voltages respectively supplied to the stator windings 11, 12 and 13 to output a phase signal g. In addition, element 5 is a phase adjusting circuit which adds or subtracts a predetermined value to or from the count value c of the counting circuit 4 in response to a direction command r inputted to an input terminal 14, then, performs the phase correction in response to the phase signal g outputted from the phase detecting circuit 10 and outputs an address signal a to the selecting circuit 9. The selecting circuit 9 selects the address signal a or the address command b in response to a phase coinciding command t inputted to a terminal 15 thereby to output an address signal f to a waveform generating circuit 6. The waveform generating circuit 6 outputs three-phase position signals p1, p2 and p3 to a power supply circuit 7 in response to the address signal f outputted from the selecting circuit 9. The power supply circuit 7 amplifies the inputted three-phase position signals p1, p2 and p3 thus inputted and respectively supplies electric currents i1, i2 and i3, which are proportional to the magnitudes of the position signals p1, p2 and p3, to the stator windings 11, 12 and 13.

The operation of the brushless DC motor structured above is explained in detail below.

First, an explanation follows for the case in which the permanent magnet rotor 20 is being rotated normally.

Figure 2:
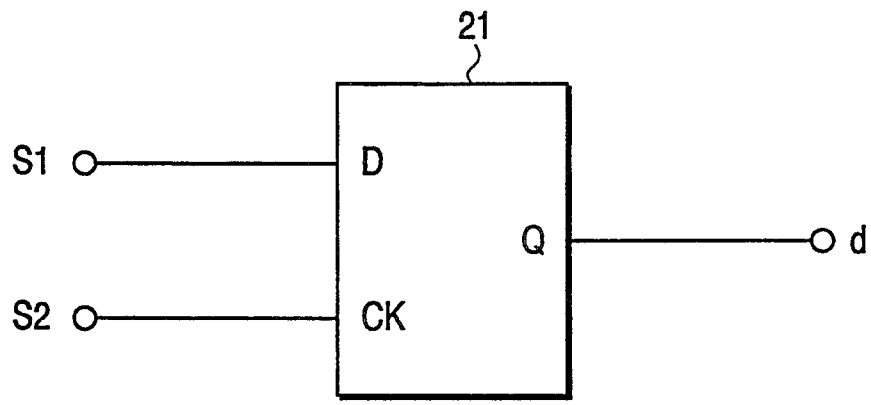
FIG. 2 is a circuit diagram of a direction detecting circuit showing an example of that shown in FIG. 1.

FIG. 2 shows a circuit structure of a direction detecting circuit showing an example of the circuit 3 shown in FIG. 1, and FIG. 3 shows a signal waveform of each member of the circuit shown in FIG. 2.

In FIG. 2, element 21 is a D-type flip-flop circuit which receives the two-phase rectangular wave signals s1 and s2 outputted from the waveform shaping circuit 2. In the flip-flop circuit 21, the rectangular wave signal s1 is inputted to a data input terminal D and the rectangular wave signal s2 is inputted to a clock input terminal CK.

Figure 3A:
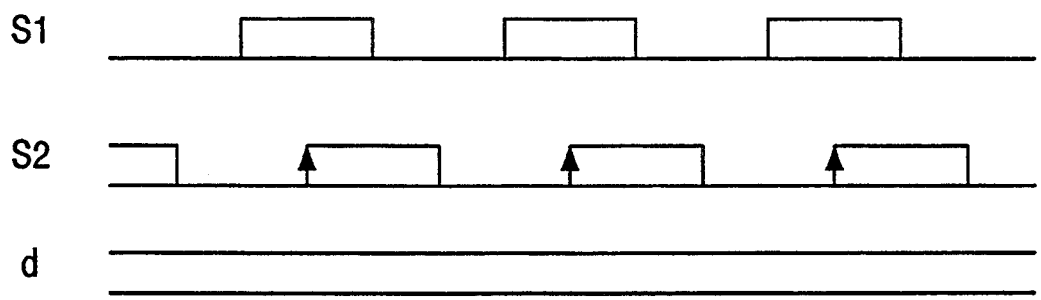
FIGS. 3(a)-3(b) are diagrams showing a signal waveform of each member of the direction detecting circuit shown in FIG. 2.
Figure 3B:
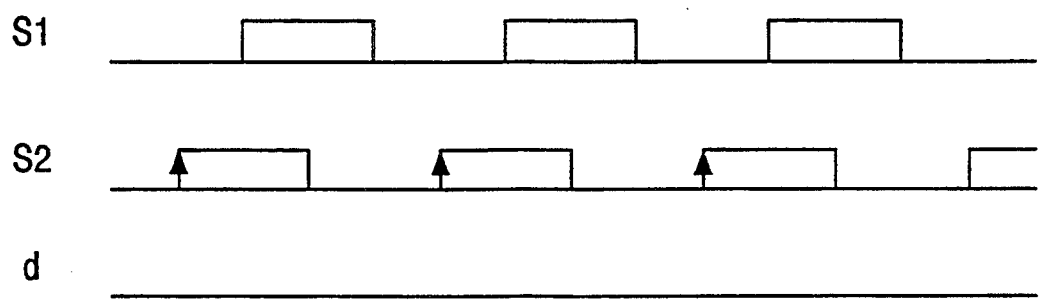

FIG. 3(a) shows the waveforms of the rectangular wave signals s1 and s2 when the permanent magnet rotor 20 is being rotated normally, and FIG. 3(b) shows the waveforms of the rectangular wave signals s1 and s2 when it is being rotated in a direction which is opposite thereto. The D-type flip-flip circuit 21 holds the state of the data input terminal d at each rising edge of the signal inputted to the clock input terminal CK to output the state thereof from an output terminal Q and as a result, when the permanent magnet rotor 20 is being rotated normally, an output signal Q of the D-type flip-flop circuit 21 is always at a high potential state (hereinafter called the "H" state) as shown in FIG. 3(a). In the other hand, when the permanent magnet rotor 20 is being rotated in the opposite direction, the output signal Q of the flip-flop circuit 21 is always at a low potential state (hereinafter called the "L" state) because the rectangular wave signal s1 is delayed in phase by 90° from the rectangular wave signal s2 as shown in FIG. 3(b). As is clear from the above explanations, a rotational direction of the permanent magnetic rotor 20 can be detected by the direction detecting circuit 3 shown in FIG. 2. That is, when the permanent magnet rotor 20 is being rotated normally, the direction signal d outputted from the direction detecting circuit 3 is the "H" state, and when it is being rotated in the opposite direction, it is the "L" state. The counting circuit 4 receives the rectangular wave signal s1 outputted from the waveform shaping circuit 2 and the direction signal d outputted from the direction detecting circuit 3 and counts up or counts down the rectangular wave signal s1 in response to the the direction signal d. This means that the number of pulses of the rectangular wave signal s1 generated in response to the rotation of the permanent magnet rotor 20 is counted up or counted down in response to the rotational direction thereof, and the amount of rotational movement of the permanent magnetic rotor 20 can be obtained from the count value of an uncertain counting circuit 4. In this case, however, the counting circuit 4 has the initial state when starting the motor and as a result, the method of providing the initial value will be shown in detail in the latter explanation on the phase coincidence operation while referring to FIGS. 10 and 11.

Figure 4:
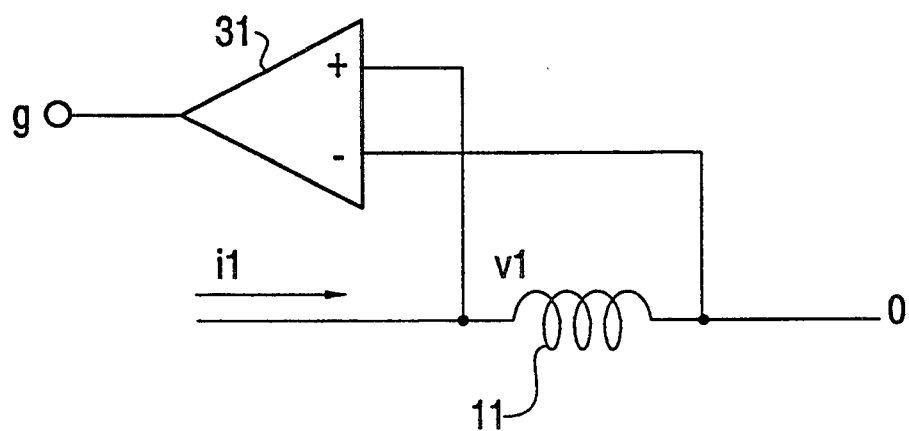
FIG. 4 is a circuit diagram of a phase detecting circuit shown an example of that showing in FIG. 1.
Figure 5:
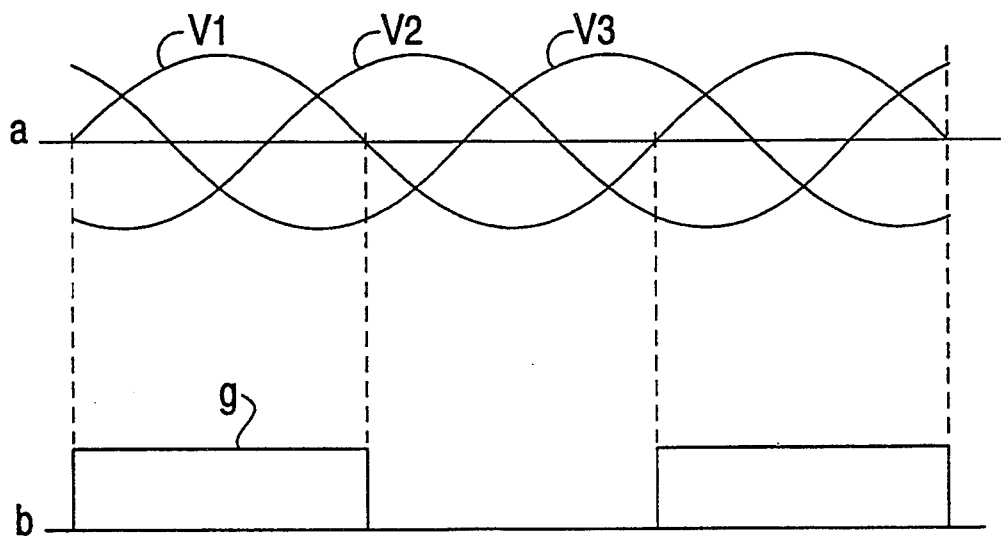
FIG. 5 is a diagram showing a signal waveform of each member of the phase detecting circuit shown in FIG. 4.

FIG. 4 shows a circuit structure of a phase detecting circuit showing an example of the circuit 10 shown in FIG. 1, and FIG. 5 shows signal waveforms of the respective members thereof.

In FIG. 4, a comparator 31 has two input terminals, one connected to each end of the stator winding 11. The comparator 31 has a non-inverting input (+) connected to a terminal voltage v1 of the stator winding 11 and an inverting input (−) connected to a neutral point O of the three-phase stator windings 11, 12 and 13. The comparator 31 outputs the phase signal g to the phase adjusting circuit 5 in response to the phase voltage of the stator winding 11.

In FIG. 5, waveform a shows the respective voltage waveforms of three-phase terminal voltages v1, v2 and v3 when the permanent magnet rotor 20 is being rotated, in which the terminal voltage v1 is connected to the non-inverting input (+) and the neutral point O of the three-phase stator windings 11, 12, and 13 is connected to the inverting input (−) of the comparator 31 and as a result, the comparator 31 can detect the sign of a phase voltage generated in the stator winding 11. As clear from waveform b of FIG. 5, the rising edge of the phase signal g is coincident with the zero-crossing point of the terminal voltage v1 to the neutral point voltage O. This means that the phase signal g outputted from the phase detecting circuit 10 is to output a timing signal of the zero-crossing point of a phase voltage of one phase of the three-phase stator windings 11, 12 and 13 and as a result, the phase detecting circuit 10 can detect the phase of a phase voltage of the stator winding 11. In addition, the operation to be carried out using the phase signal g will be discussed in detail in the latter explanation of the phase correction while referring to FIGS. 12 and 13.

The following is an explanation of the operation of the brushless DC motor of this embodiment when it is being rotated normally.

Figure 6:
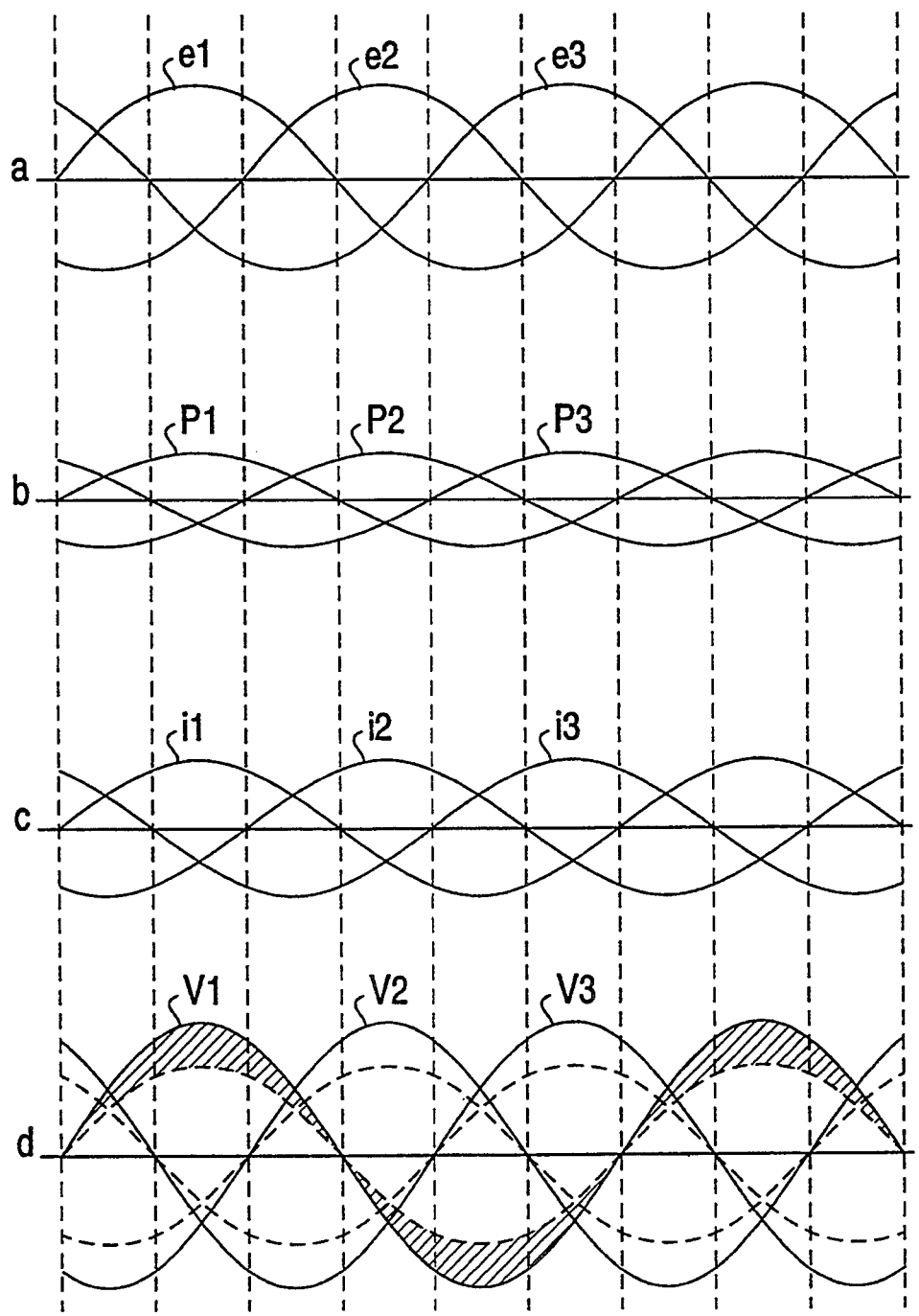
FIG. 6 is a diagram showing a signal waveform of each member of the circuit shown in FIG. 1 when rotating stationarily.

FIG. 6 is a diagram showing a signal waveform of each member of the brushless DC motor shown in FIG. 1 when it is being rotated normally, in which waveform of a FIG. 6 shows respective waveforms of induced voltages e1, e2 and e3 respectively induced in the rotator windings 11, 12 and 13; waveform b of FIG. 6b shows three-phase position signals p1, p2 and p3 generated in the waveform generated circuit 6, which are generated in accordance with the rotational position of the permanent magnet rotor 20 and which are respectively coincident in phase with the induced voltages e1, e2 and e3; waveform c of FIG. 6 shows three-phase driving currents i1, i2 and i3 supplied to the respective phases of the stator windings 11, 12 and 13, which are generated by amplifying the sine-wave position signals p1, p2 and p3 by the power supply circuit 7, and waveform d of FIG. 6 shows the terminal voltages v1, v2 and v3 of respective phases of the stator windings 11, 12 and 13, which are obtained by combining the induced voltages e1, e2 and e3 induced in respective phases of the stator windings 11, 12 and 13 with the voltage drop components (only the case of the voltage v1 is shown hatched here) due to the winding resistances and generated by the drive currents i1, i2 and i3 flowing to the respective phases of the three-phase stator windings 11, 12 and 13. As clear from FIG. 6, the induced voltages e1, e2 and e3, position signals p1, p2 and p3, driving currents i1, i2 and i3, and terminal voltages v1, v2 and v3 are respectively coincident in phase with each other and when the induced voltages e1, e2 and e3 and driving currents i1 i2 and i3 are respectively coincident in phase with each other, the motor is driven at the highest efficiency.

A rotating magnetic field is generated in the stator windings 11, 12 and 13 by the three-phase driving currents i1, i2 and i3, and is due to the mutual action of the rotating magnetic field thus generated with a rotating magnetic field caused by the magnetic pole of the permanent magnet rotor 20 and the stator windings 11, 12 and 13, the permanent magnet rotor 20 being supplied with a rotational force thereby causing the rotor to start to rotate.

Figure 7A:
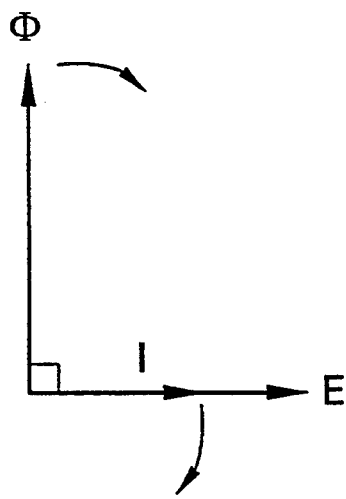
FIGS. 7(a)-7(b) are vector diagrams showing a relationship of a magnetic pole vector $\Phi$ of a permanent magnetic rotor, a magnetomotive force vector I generated by stator windings and an induced voltage E induced in the stator windings of the brushless DC motor shown in FIG. 1 when rotating stationarily.
Figure 7B:
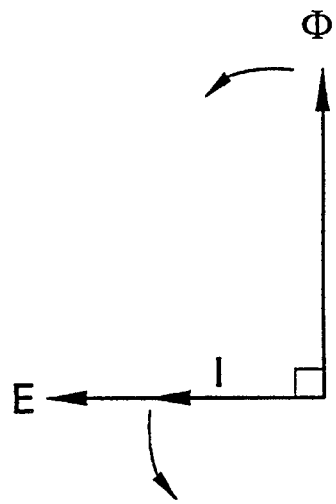

FIGS. 7(a)-7(b) are is a vector diagrams showing a phase relationship of a magnetic pole of the permanent magnet rotor 20 and a rotating magnetic field generated by the stator windings 11, 12 and 13. In FIG. 7(a)-7(b), Φ is a magnetic pole vector showing a magnetic pole of the permanent magnet rotor 20, I is a magnetomotive force vector showing a rotating magnetic field generated by the stator windings 11, 12 and 13, and E is an induced voltage vector showing an induce voltage induced in the stator windings 11, 12 and 13.

FIG. 7(a) shows in vector terms the case when the motor is being rotated in the positive direction (clockwise direction) and FIG. 7(b) shows in vector terms the case when it is being rotated in the opposite direction (counterclockwise direction); in each case, the magnetomotive force vector I and the magnetic pole vector Φ are respectively rotated in the direction shown by the arrows. As is clear from FIGS. 7(a)-7(b), in order to rotate the permanent magnet rotor 20 continuously, the phase of the magnetomotive force vector I generated by the stator windings 11, 12 and 13 must always be advanced by 90° in the rotational direction from the phase of the magnetic pole vector Φ of the permanent magnet rotor 20. That is, in order to rotate the motor in the normal direction, the magnetomotive force vector I must be advanced by 90° clockwise and in order to rotate it in the opposite direction, the magnetomotive force vector I must be advanced by 90° counterclockwise.

As clear from FIGS. 7(a)-7(b), the magnetomotive force vector I and the induced voltage vector E are coincident in phase with each other independent of the rotational direction of the motor. Under such a state, the motor is driven at the highest efficiency.

Each member of the brushless DC motor of this invention for performing signal processings as shown above will be further explained in detail.

Figure 8:
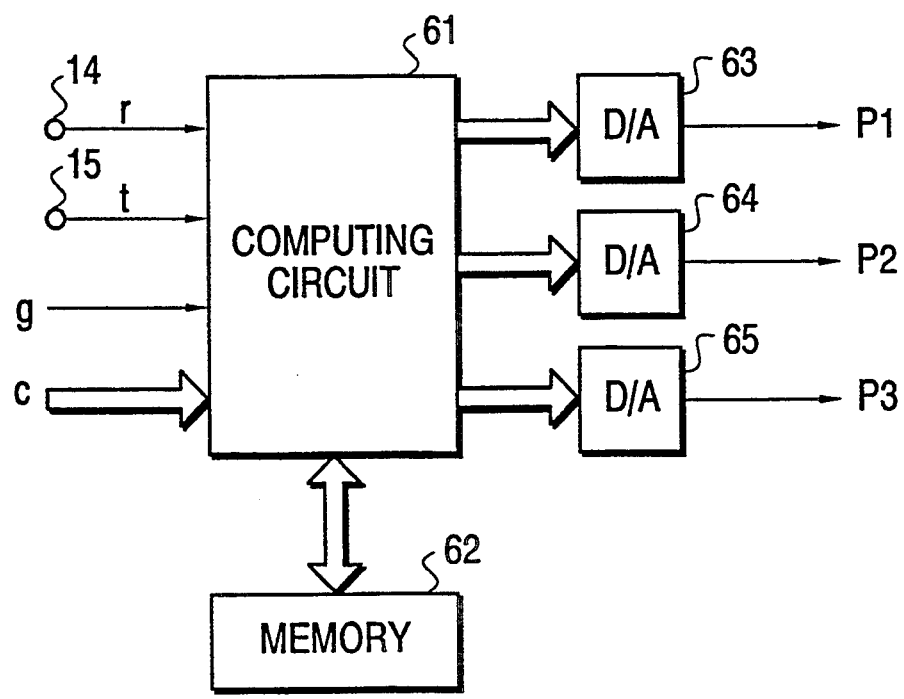
FIG. 8 is a block diagram showing an arrangement of a phase adjusting circuit, waveform generating circuit, initial position detecting circuit and selecting circuit comprising the brushless DC motor shown in FIG. 1.

FIG. 8 is a circuit diagram showing an example of an arrangement of the phase adjusting circuit 5, the waveform generating circuit 6, the initial position detecting circuit 8 and the selecting circuit 9 shown in FIG. 1.

In this embodiment, the phase regulating circuit 5, waveform generating circuit 6, initial position detecting circuit 8 and selecting circuit 9 are comprised of a computing circuit 61, a memory 62 and digital to analog converts 63, 64 and 65. The computing circuit 61 operates in conformity with a predetermined built-in program stored in a read only memory (ROM) region of the memory 62, which will be shown in detail latter, to fetch the direction command r inputted to the terminal 14, the phase coincidence command t inputted to the terminal 15, the phase signal g outputted from the phase detecting circuit 10 and the count value c of the counting circuit 4 into a random access memory (RAM) region of the memory 62 and carries out a predetermined computing process to thereby obtain an address f. Next, the computing circuit 61, in response to the, refers to a sine-wave function table for one period stored in the ROM region of the memory 62 in advance so as to thereby obtain three-phase digital position signals dp1, dp2 and dp3 which are in response to the address f and outputs them respectively to the digital to analog converters 63, 64 and 65. The digital to analog converters 63, 64 and 65 respectively convert the three-phase digital position signals dp1, dp2 and dp3 into analog values so as to thereby to output the three-phase position signals p1, p2 and p3.

Next, the built-in program stored in the ROM region of the memory 62 will be explained below.

First, the normal mode of performing processes when rotating normally will be explained while referring to the basic flow diagram shown in FIG. 9.

Figure 9:
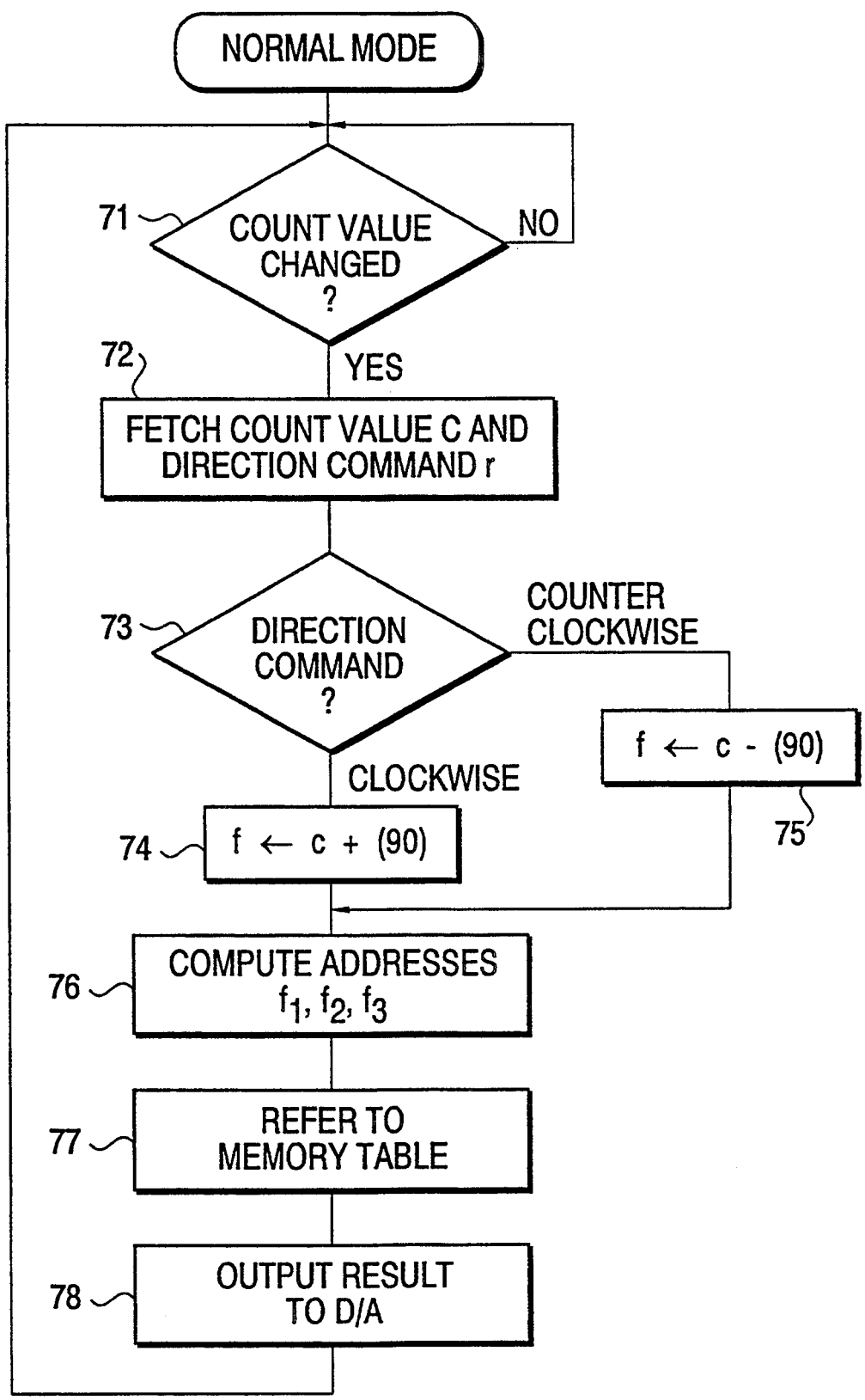
FIG. 9 is a flow diagram for explaining a normal mode process of the brushless DC motor shown in FIG. 1.

In FIG. 9, in a process 71, a determination is made as to whether or not the count value c of the counting circuit 4 is varied is waited. If the value has varied, the process goes to a process 72.

In the process 72, the count value c of the counting circuit 4, the direction command signal r inputted to the terminal 14 are input into the RAM region of the memory 62 for storage.

In a process 73, a determination is made as to whether the direction command signal r is a clockwise direction or counterclockwise one. If it is judged to be clockwise, the process goes to a process 74 in which a predetermined value (equivalent to 90° in terms of phase) is added to the count value c of the counting circuit 4 to obtain the address f. If it is judged to be counterclockwise, it goes to a process 75 in which a predetermined value (equivalent to 90° in terms of phase) is subtracted from the count value c of the counting circuit 4 to obtain the address f. The processes 71, 72, 73, 74 and 75 perform the operational processes that the phase adjusting circuit 5 does.

In a process 76, three-phase addresses f1, f2 and f3 which are necessary in the next process 76 are obtained in accordance with the address signal f obtained by the process 74 or process 75.

That is, the phases of the position signals p1, p2 and p3 are shifted by 120° to each other (see FIG. 6) and as a result, the three-phase addresses f1, f2 and f3 are computed as follows:

$$f1 = f \quad (1)$$

$$f2 = f + (120) \quad (2)$$

$$f3 = f - (120) \quad (3)$$

In addition (120) is an address count value equivalent to 120° in terms of phase.

In the process 77, the sine-wave function table stored in the ROM region of the memory 62 is referred to on the basis of the address values f1, f2 and f3 obtained in the process 76 to obtain the three-phase digital position signals dp1, dp2 and dp3.

In a process 78, the three-phase digital position signals dp1, dp2 and dp3 obtained in the process 77 are outputted respectively to the digital to analog converters 63, 64 and 65. The digital to analog converters 63, 64 and 65 convert the digital position signals dp1, dp2 and dp3 into respective analog values to output the position signals p1, p2 and p3 as shown in FIG. 6. The processes 76, 77 and 78 perform the operational processes that the waveform generating circuit 6 does. After performing the process 78, it goes to the process 71 so as to thereby repeat the above-mentioned processes.

By performing such processes by the phase adjusting circuit 5 and waveform generating circuit 6, the position signals p1, p2 and p3 are supplied to the power supply circuit 7 in response to the rotation of the permanent magnet rotor 20. The power supply circuit 7 supplies the sine-wave driving currents i1, i2 and i3 respectively to the stator windings 11, 12 and 13. That is, the amount of rotational movement of the permanent magnet rotor 20 is detected, and the magnetic field generated by the stator windings 11, 12 and 13 is rotated by the amount thus detected. As a result, the stator windings generate a rotating magnetic field, and the magnetomotive force vector I of the rotating magnetic field is formed so as to always be different in phase by 90° from the magnetic pole vector Φ of the permanent magnet rotor 20 as shown in FIGS. 7(a)-7(b). Thus, due to the mutual action of the magnetic pole vector Φ and the magnetomotive force vector I, the permanent magnet rotor 20 is supplied with a rotational force so as to thereby continue the rotation.

However, under an initial stage in which a power source is turned ON or the like, the count value of the counting circuit 4 is uncertain, resulting in a necessity to give an initial value cs of the count value thereto.

Next, the operation of phase coincidence to give the initial value to the counting circuit 4 in the brushless DC motor of this embodiment will be explained in detail.

When starting, the phase coincidence command signal t is inputted to the terminal 15 of the selecting circuit 9 shown in FIG. 1, and the output signal b of the initial position detecting circuit 8 is selected through the selecting circuit 9 to be outputted to the waveform generating circuit 6 as the address f. The initial position detecting circuit 8 rotates forcibly the rotating magnetic field generated by the stator windings 11, 12 and 13 clockwise or counterclockwise so as to thereby detect the phase relationship of the magnetic pole of the permanent magnet rotor 20 and the rotating magnetic field generated by the stator windings 11, 12 and 13.

Figure 10A:
FIGS. 10(a)-10(c) are vector diagrams showing a relationship of a magnetic pole vector $\Phi$ of a permanent magnet rotor and a magnetomotive force vector I generated by stator windings of the brushless DC motor shown in FIG. 1 during a phase coincidence operation.
Figure 10B:
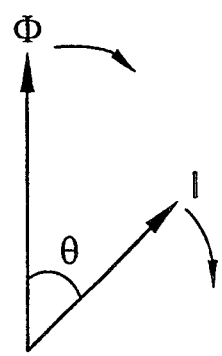
Figure 10C:
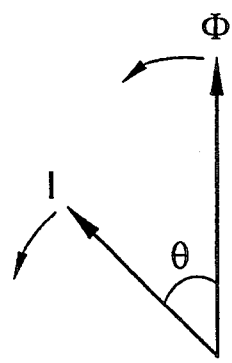

FIGS. 10(a)-10(c) are is a vector diagrams showing a relationship of the magnetic pole vector Φ generated by the permanent magnet rotor 20 and the magnetomotive force vector I generated by the stator windings 11, 12 and 13, which are for the sake of explaining the phase coinciding operation of this embodiment.

When the phases are coincident with each other, the selecting circuit 9 outputs the address command b of the initial position detecting circuit 8 to the waveform generating circuit 6, and the address f inputted to the waveform generating circuit 6 is forcibly changed independent of the rotation of the permanent magnet rotor 20, whereby the direction of the magnetomotive force vector I of the stator windings is changed in response to the address f thus changed. As a result, by the mutual action of the magnetomotive force vector I and the magnetic pole vector Φ, the permanent magnet rotor 20 is supplied with a rotational force so as to cause it to rotate. If the motor is unloaded, the magnetomotive force vector I and the magnetic pole vector Φ are perfectly coincident with each other (in this case, the torque that the motor generates becomes zero), the state of which is shown in FIG. 10(a). However, if the motor is loaded, the magnetomotive force vector I and the magnetic pole vector Φ are not coincident with each other, thus making a phase angle θ therebetween in accordance with the magnitude of the load. Furthermore, the phase shift direction is that when the motor is rotated clockwise, the magnetic pole vector Φ is shifted by an angle θ counterclockwise from the magnetomotive force vector I as shown in FIG. 10(b), and when the motor is rotated counterclockwise, the magnetic pole vector Φ is shifted by the angle θ clockwise from the magnetomotive force vector I as shown in FIG. 10(c). In this case, however, the counting circuit 4 counts up or counts down the rectangular wave signal s1 in response to the direction signal d, so that the permanent magnet rotor 20 is always detecting the amount of its rotational movement from the initial value. Here, if the initial value of the counting circuit 4 is expressed as cs, and if the magnetomotive force vector I of the stator windings is rotated by Δf clockwise, the count value c1 of the counting circuit 4 can be obtained as:

$$c1 = cs + \Delta f - h \qquad (4)$$

where h is a count value equivalent to the phase angle θ shown in FIGS. 10(a)–10(c) in terms of phase.

Also, if the magnetomotive force vector I of the stator windings is rotated by Δf counterclockwise, the count value c2 of the counting circuit 4 can be obtained as:

$$c2 = cs - \Delta f + h \qquad (5)$$

Hence, the initial value cs of the counting circuit 4 can be calculated as:

$$cs = (c1 + c2)/2 \qquad (6)$$

Figure 11:
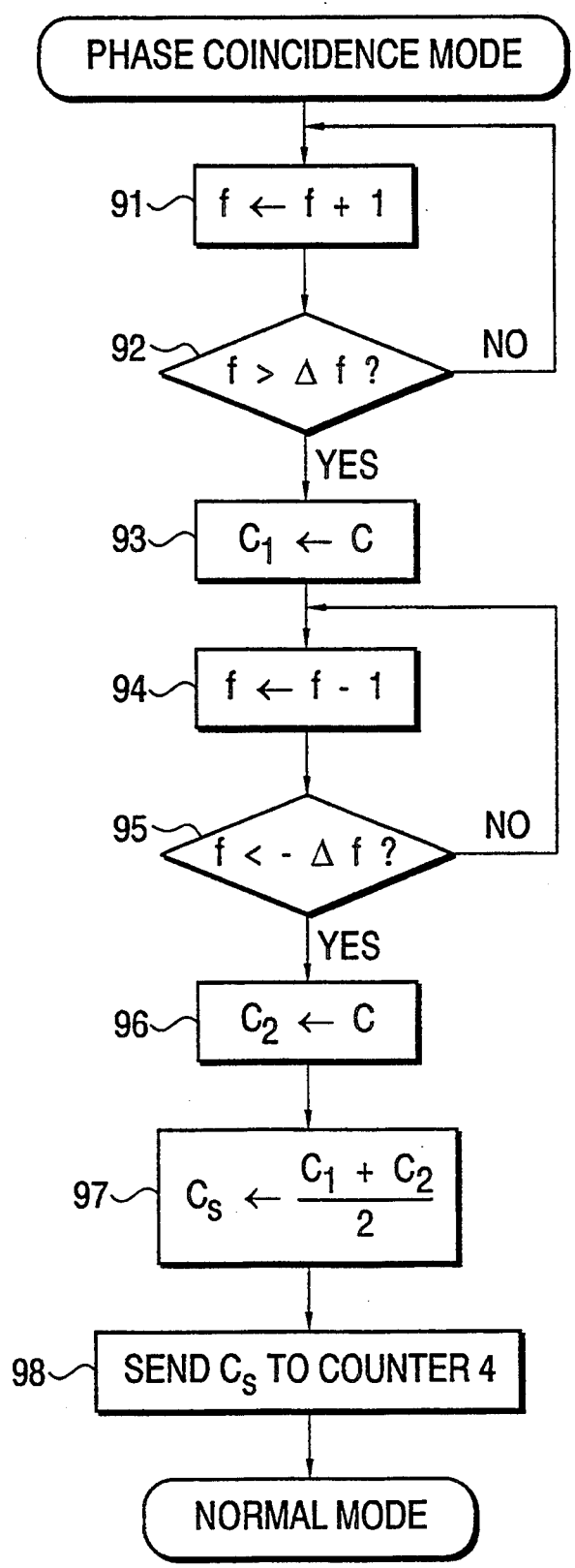
FIG. 11 is a flow diagram for explaining a phase coincidence operation of the brushless DC motor shown in FIG. 1.

Further detailed explanations follow on the operation of performing the phase coincidence process of this embodiment while referring to FIG. 11 which is a flow diagram for explaining the phase coincidence mode in which the phases are coincident with each other.

In FIG. 11, in a process 91, the address signal f is increased by one, and the process goes to a process 92. In this case, the initial value of the address f during phase coincidence is made zero.

In the process 92, a determination is made as to whether or not the address f exceeds a specific value Δf. If the address f does not exceed the value Δf, the process returned to the process 91 again so as to thereby further increase the address f by one. Then, if the address f exceeds the value Δf, the process goes to a process 93.

In the process 93, the count value c of the counting circuit 4 is fetched and stored as the first count value c1 in the RAM region of the memory 62 and then, the process goes to a process 94.

In the process 94, the address signal f to be inputted to the waveform generating circuit 6 is decreased by one at this time, and the process then goes to a process 95.

In the process 95, a determination is made as to whether or not the address f exceeds a specific value −Δf. If the address f does not exceed −Δf, the process is returned to the process 94 again to further decrease the address f by one. Then, if the address f exceeds −Δf, the process goes to a process 96.

In the process 96, the count value c of the counting circuit 4 is fetched and stored as the second count value c2 in the RAM region of the memory 62 and then, the process goes to a process 97.

In the process 97, the calculation is carried out using equation (6) in terms of the first and second count values c1 and c2 obtained respectively through the processes 93 and 96 to obtain the initial value cs of the counting circuit 4. After finishing the calculating process in the process 97, the process goes to a process 98.

In the process 98, the value cs obtained through the process 97 is sent to the counting circuit 4 as the initial value.

These processes from the process 91 to the process 98 are the operation of the phase coincidence mode in the initial state such as the case of starting the motor. Thus, the phase coincidence operation of the magnetic pole vector Φ of the permanent magnet rotor 20 and the magnetomotive force vector I generated by the stator windings 11, 12 and 13 is completed (see FIG. 10(a).

After completing the phase coinciding process, the process goes to the normal mode shown in FIG. 9 so as to thereby rotate the permanent magnet rotor 20.

A detailed explanation follows as to the phase correction to be carried out when the brushless DC motor of this embodiment is being rotated normally.

Figure 12:
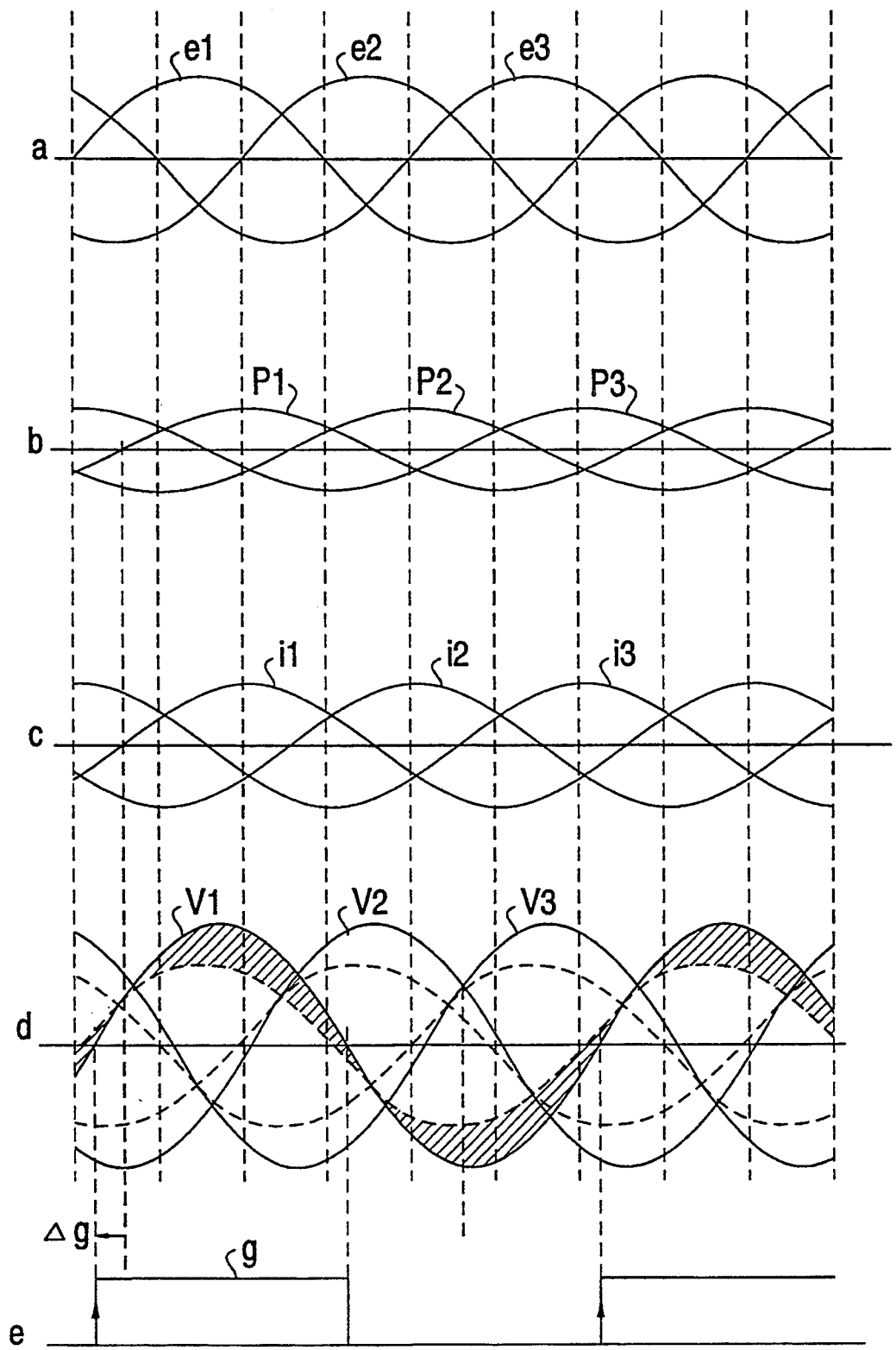
FIG. 12 is a diagram showing a signal waveform of each member of the brushless DC motor shown in FIG. 1 when the phase detecting circuit shown in FIG. 4 is used and the phase of an induced voltage induced in each of the stator windings is shifted from the phase of a drive current outputted to the corresponding one of the stator windings.

FIG. 12 is a signal waveform diagram of each member of the brushless DC motor shown in FIG. 1, in which the waveforms of the induced voltages e1, e2 and e3 induced respectively in the stator windings 11, 12 and 13, the waveforms of the voltages and currents of respective members when the phases of the driving currents i1, i2 and i3 outputted to the respective phases of the stator windings 11, 12 and 13 are shifted, and the waveform of the phase signal g outputted from the phase detecting circuit 10 are shown.

Waveform a of FIG. 12 shows the induced voltages e1, e2 and e3 induced respectively in the stator windings 11, 12 and 13. Waveform b of FIG. 12 shows the sine-wave position signals p1, p2 and p3 outputted from the waveform generating circuit 6 and waveform C of FIG. 12 shows the driving currents i1, i2 and i3 respectively outputted to the stator windings 11, 12 and 13. The position signals p1, p2 and p3, each of which is a sine-wave signal, are sent to the power supply circuit 7 in which these sine-wave position signals p1, p2 and p3 are amplified and converted respectively into the sine-wave three-phase driving currents i1, i2 and i3 so as to thereby send them to respective phases of the stator windings 11, 12 and 13 and as a result, the position signals p1, p2 and p3 and the driving signals i1, i2 and i3 are respectively coincident in phase with each other. Waveform d of FIG. 12 shows the terminal voltages v1, v2 and v3 of respective phases of the stator windings 11, 12 and 13, which are obtained by combining the induced voltages e1, e2 and e3 induced in respective phases of the stator windings 11, 12 and 13 with the voltage drop components (only the case of the induced voltage v1 is hatched as shown here) due to the winding resistances generated by the driving currents i1, i2 and i3 outputted to the respective phases of the stator windings 11, 12 and 13. As clear from FIG. 12, the induced voltages e1, e2 and e3, driving currents i1, i2 and i3 and terminal voltages v1, v2 and v3 are all different in phase. Particularly, the induced voltages e1, e2 and e3 and driving currents i1, i2 and i3 are respectively shifted in phase, so that the motor is not driven at the highest efficiency. Waveform e of FIG. 12 shows the phases signal g outputted from the phase detecting circuit 10 shown in FIG. 4. Similar to the case shown in FIG. 5, the rising edge of the position signal g is coincident with the zero crossing point at which the terminal voltage v1 crosses the neutral point potential O from the downside to the upside direction, and the falling edge of the position signal g is coincident with the zero crossing point at which the terminal voltage v1 crosses the neutral point potential O from the upside to the downside direction. In addition, the rising edge of the phase signal g is shifted in phase by Δg from the zero crossing point of the position signal p1 (or the driving signal i1).

A detailed explanation follows as to the phase correction to be performed in this embodiment of this invention, in which the induced voltages e1, e2 and e3 and the driving currents i1, i2 and i3 are coincident in phase with each other in response to the phase signal g outputted from the phase detecting circuit 10 as already shown in FIG. 6.

Figure 13:
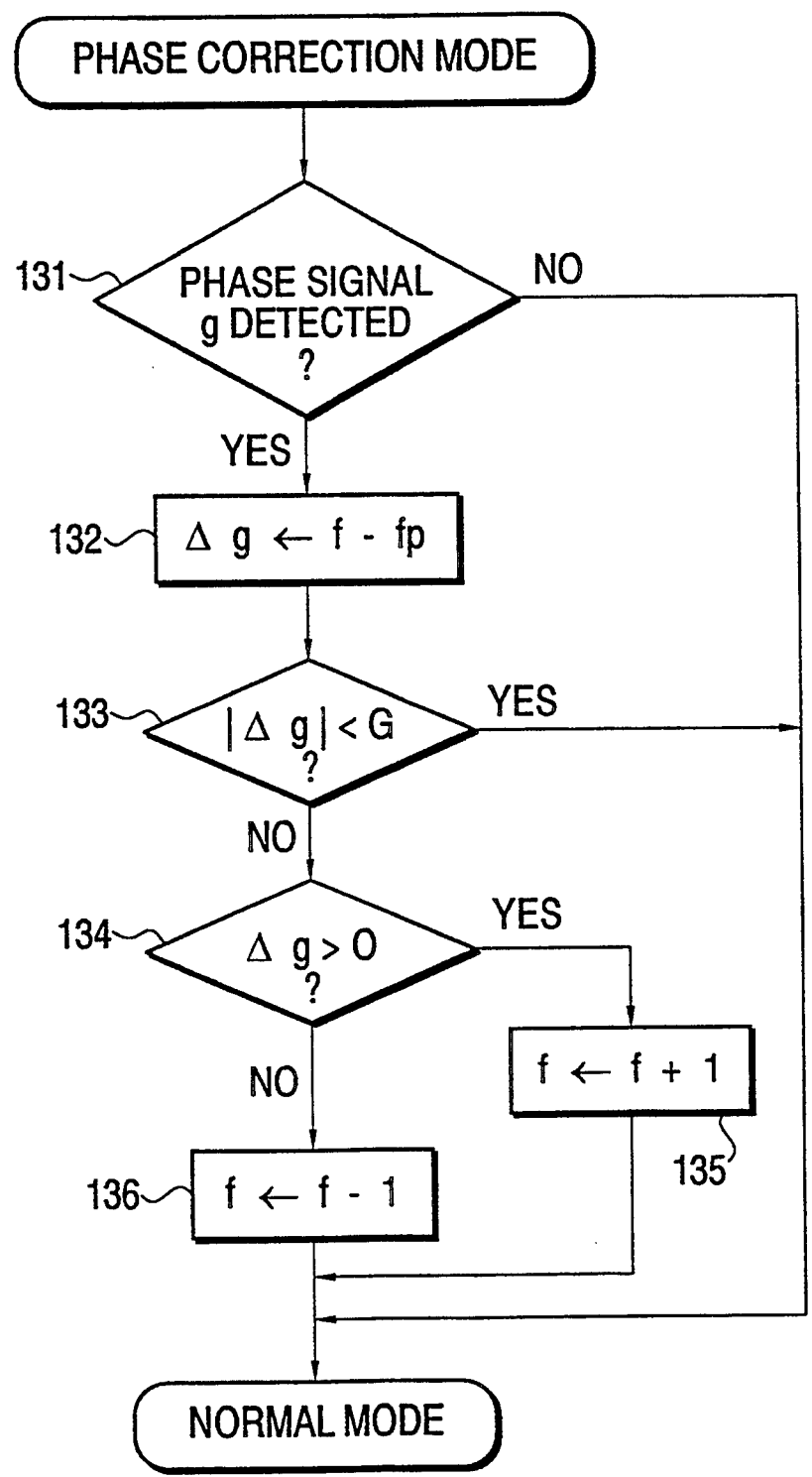
FIG. 13 is a flow diagram for explaining a phase correcting operation of the brushless DC motor shown in FIG. 1.

FIG. 13 is a flow diagram for explaining the phase correction mode where the phase correction is carried out in this embodiment while referring to FIG. 13.

In FIG. 13, in a process 131, a determination is made as to whether or not a rising edge of the phase signal g outputted from the phase detecting circuit 10 has occurred. If the rising edge of the phase signal g is not generated, the process goes to the normal mode operation, and if the rising edge of the phase signal g is generated, the process goes to a process 132. In the process 132, the difference $\Delta g$ (=f−fp) between the address value f inputted to the waveform generating circuit 6 at the time point when the rising edge of the phase signal g is generated and an address value fp which is equivalent to the zero crossing point of the position signal p1 outputted from the waveform generating circuit 6 is calculated and stored as the phase difference $\Delta g$ in the RAM region of the memory 62 and then, the process goes to a process 133. In the process 133, a determination is made as to whether or not the magnitude of the phase difference $\Delta g$ obtained through the process 132 is within the range of a predetermined value G. If the magnitude of the phase difference $\Delta g$ is smaller than the predetermined value G, the process is shifted to the normal mode, and if the magnitude of the phase difference $\Delta g$ is larger than the predetermined value G, the process goes to a process 134. In the process 134, the sign of the phase difference $\Delta g$ thus obtained is determination. If the sign of the phase difference $\Delta g$ is positive, the process goes to a process 135. In the process 135, the address value f is increased by one and then the process goes to the normal mode. If the sign of the phase difference $\Delta g$ is not positive, the process goes to a process 136, in which the address value f is decreased by one and then, the process is shifted to the normal mode.

These processes from the process 131 to the process 136 are the operation of the phase correction mode of this embodiment.

By performing the processes shown in the flow diagram of FIG. 13, the zero crossing point of each of the terminal voltages v1, v2 and v3 to the neutral point potential O is processes so as to be coincident with the corresponding one of the position signals p1, p2 and p3 outputted from the waveform generating circuit 6. This means that if the zero crossing point of the terminal voltage v1 is advanced from the address value fp corresponding to the zero crossing point of the position signal p1 as shown in waveform e of FIG. 12, the phases of the position signals p1, p2 and p3 are advanced by decreasing the address value f of the position signals inputted to the waveform generating circuit 6. On the other hand, if the zero crossing point of the terminal voltage v1 is delayed from the address value fp corresponding to the zero crossing point of the position signal p1, the phases of the position signals p1, p2 and p3 are delayed by increasing the address value f of the position signals inputted to the waveform generating circuit 6. As a result, the phases of the position signals p1, p2 and p3 (which are equal to the phases of the driving currents i1, i2 and i3) outputted from the waveform generating circuit 6 are respectively coincident with the phases of the terminal voltages v1, v2 and v3, and the phases of the induce voltages v1, v2 and v3 are respectively coincident with the phases of the driving currents i1, i2 and i3, as shown in FIG. 6, and thus, the motor is driven at the highest efficiency.

Accordingly, even if the initial position cannot be precisely detected in the phase coincidence mode shown in FIG. 11, the induced voltages e1, e2 and e3 and the driving currents i1, i2 and i3 can be respectively coincident in phase with each other through the phase correction mode shown in FIG. 13 when rotating normally. In addition, even if a noise is additionally imposed on the frequency generator 1 for any reason when the motor is being driven and the count value of the counting circuit is erroneous, the induced voltages e1, e2 and e3 and the driving currents i1, i2 and i3 can be automatically made respectively coincident in phase when rotating normally through the phase correction mode shown in FIG. 13. As a result, a worst case condition in which the motor itself is stopped due to the accumulation of errors of the count value of the counting circuit 4 caused by the noise thus additionally imposed on the frequency generator 1 can be prevented from occurring.

Figure 14:
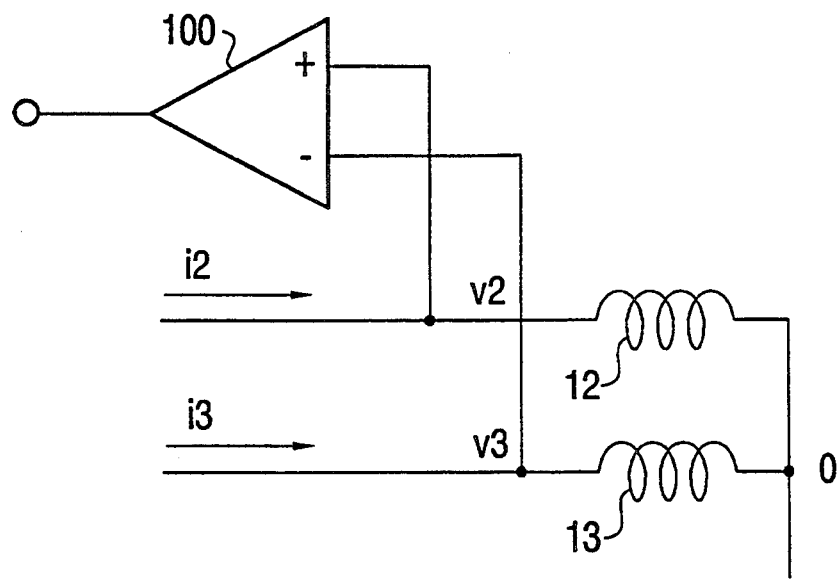
FIG. 14 is a circuit diagram of a phase detecting circuit showing another example of that shown in FIG. 4.
Figure 15:
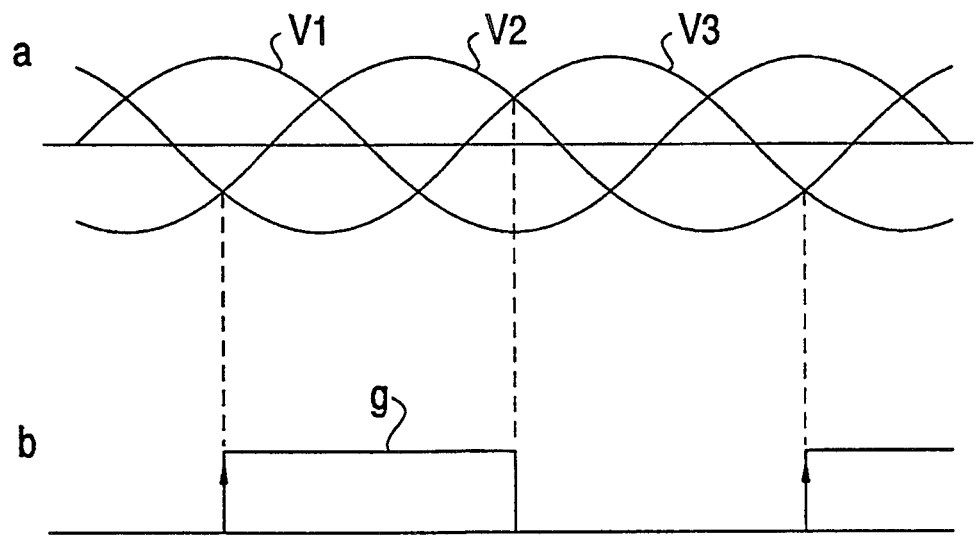
FIG. 15 is a diagram showing a signal waveform of each member of the phase detecting circuit shown in FIG. 14.

FIG. 14 is a circuit diagram of a phase detecting circuit showing another example of the circuit 10 shown in FIG. 4, and FIG. 15 is a diagram showing a signal waveform of each member of the phase detecting circuit shown in FIG. 14.

In FIG. 14, a comparator 100 receives two terminal voltages (v2 and v3 in this case) out of the three-phase terminal voltages of the stator windings 11, 12 and 13. The comparator 100 compares the magnitudes of the two terminal voltages v2 and v3 and outputs the phase signal g to the phase adjusting circuit 5 in accordance with the result thus obtained by comparison.

Waveform a of FIG. 15 shows a waveform of each of the three-phase terminal voltages v1, v2 and v3 when the permanent magnet rotor 20 is being rotated. The terminal voltage v2 is connected to a non-inverting input (+) of the comparator 100 and the terminal voltage v3 is connected to an inverting input (−) of the comparator 100, and if v2>v3, the phase signal g outputted form the comparator 100 is in an "H" state, and if v2>v3, the output g outputted from the comparator 100 is in an "L" state, which are shown in waveform b of FIG. 15. As clear from waveform b of FIG. 15, the terminal voltages v1, v2 and v3 are three-phase symmetrical signals, so that the rising edge of the phase signal g is coincident with the maximum peak point of the terminal voltage v1, and the falling edge of the phase signal g is coincident with the minimum peak point of the terminal voltage v1. That is, the phase signal g outputted from the phase detecting circuit 10 is to output a timing of the peak point of the terminal voltage v1 of the three-phase terminal voltages v1, v2 and v3 of the stator windings 11, 12 and 13, thus being capable of detecting the phase of the terminal voltage v1 by the phase detecting circuit 10.

A detailed explanation follows as to the phase correction operation to be carried out when rotating normally in the case of using the phase detecting circuit shown in FIG. 14 of this embodiment.

Figure 16:
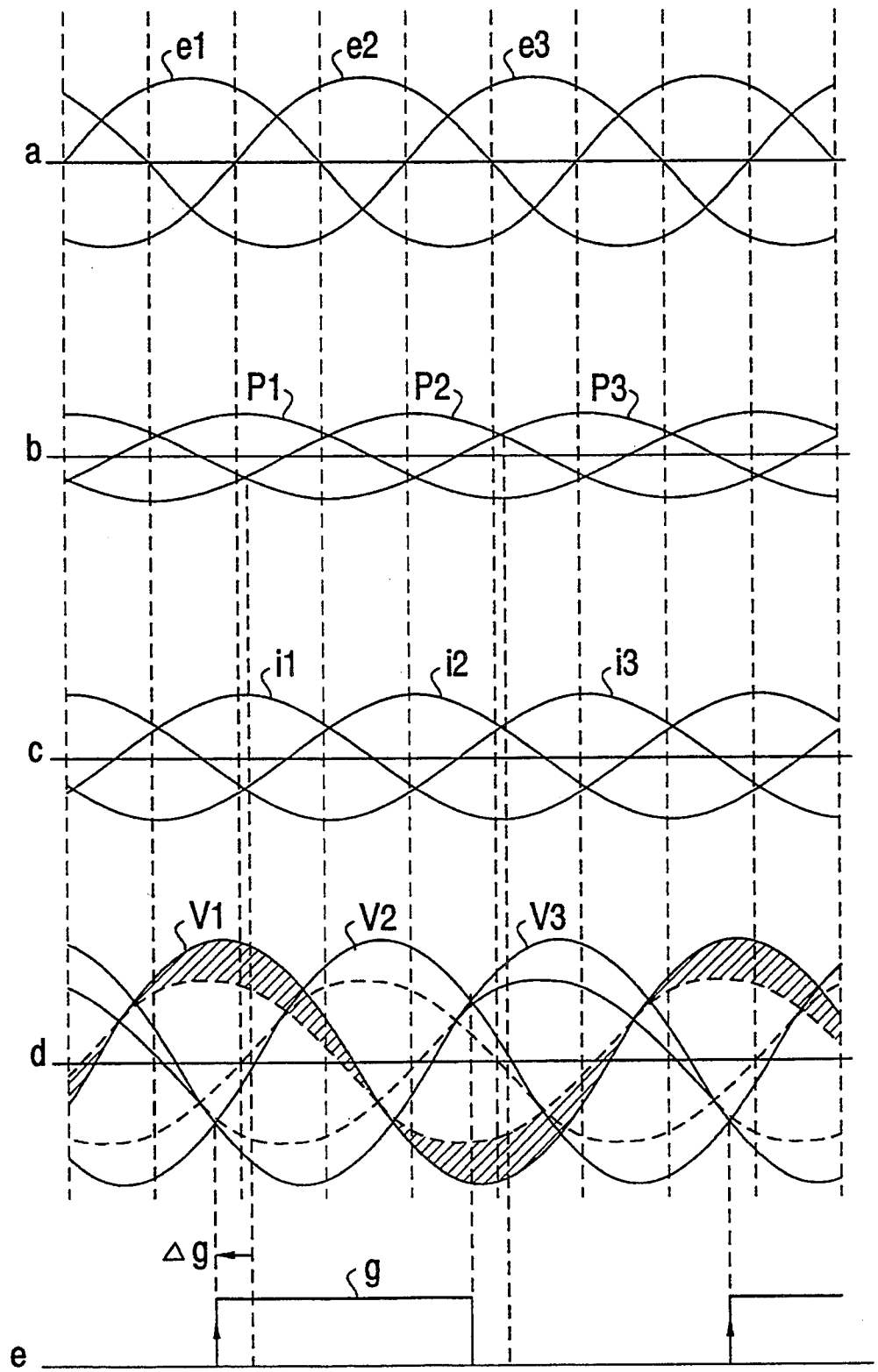
FIG. 16 is a diagram shown a signal waveform of each member of the brushless DC motor shown in FIG. 1 when the phase detecting circuit shown in FIG. 14 is used and the phase of an induced voltage induced in each of the stator windings is shifted from the phase of a drive current outputted to the corresponding one of the stator windings.

FIG. 16 shows the waveforms of the induced voltages e1, e2 and e3 induced respectively in the stator windings 11, 12 and 13, the waveforms of voltages and currents outputted from respective circuits when the driving currents i1, i2 and i3 outputted to respective phases of the stator windings 11, 12 and 13 are shifted in phase with respect to each other, and the phase signal g outputted from the phase detecting circuit 10.

Waveform of a FIG. 16a shows the induced voltages e1, e2 and e3 induced respectively in the stator windings 11, 12 and 13. Waveform b of FIG. 16 shows the sine-wave position signals p1, p2 and p3 outputted from the waveform generating circuit 6, and waveform c of FIG. 16 shows the driving currents i1, i2 and i3 outputted respectively to the stator windings 11, 12 and 13. The position signals p1, p2 and p3 are sine-wave signals. The power supply circuit 7 amplifies these position signals p1, p2 and p3 and converts them into the sine-wave three-phase driving currents i1, i2 and i3 respectively supplied to the phases of the stator windings 11, 12 and 13, so that the position signals p1, p2 and p3 are made respectively equal in phase with respect to the driving currents i1, i2 and i3. Waveform d of FIG. 16 shows the terminal voltages v1, v2 and v3 of respective phases of the stator windings 11, 12 and 13, which are obtained by combining the induced voltages e1, e2 and e3 induced in respective phases of the stator windings 11, 12 and 13 with the voltage drop components (only the case of the induced voltage v1 is hatched as shown here) due to the winding resistances generated by the flow of the driving currents i1, i2 and i3 to the prospective phases of the stator windings 11, 12 and 13. As clear from FIG. 16, the induced voltages e1, e2 and e3, driving currents i1, i2 and i3 and terminal voltages are all different in phase. Particularly, the induced voltages e1, e2 and e3 and driving currents i1, i2 and i3 are respectively shifted in phase with respect to each other, so that the motor cannot be driven at the highest efficiency. Waveform e of FIG. 16 shows the phase signal g outputted from the phase detecting circuit 10 shown in FIG. 14. Similar to the case shown in FIG. 15, the rising edge of the phase signal g is coincident with the maximum peak point of the terminal voltage v1 and the falling edge of the position signal g is coincident with the minimum peak point of the terminal voltage v1. In addition, the rising edge of the phase signal g is shifted in phase by $\Delta g$ from the maximum peak point of the position signal p1 (or the driving circuit i1).

Here, the explanation as to the operation of performing the phase correction so as to cause the phases of the induced voltages e1, e2 and e3 to be respectively coincident with the phases of the driving currents i1, i2 and i3 in response to the phase signal g outputted from the phase detecting circuit 10 of this embodiment has been omitted for the sake of avoiding duplication since it is the same as that shown in FIG. 13. In addition, in the case of using the phase detecting circuit 10 as shown in FIG. 4, the operation is carried out so that the zero crossing point of the terminal voltage v1 of the stator winding 11 is coincident with the zero crossing point of the position signal p1 (or the driving current i1), but in the case of using the phase detecting circuit 10 as shown in FIG. 14, the operation is carried out so that the maximum peak point of the terminal voltage v1 of the stator winding 11 is coincident with the maximum peak point of the position signal (or the driving current i1). However, these two cases are not different in operation in that the phase of the position signals p1, p2 and p3 outputted from the waveform generating circuit 6, (which are equal to the phases of the driving currents i1, i2 and i3), and the phases of the terminal voltages v1, v2 and v3 are processed so as to be coincident with each other and the phases of the induced voltages e1, e2 and e3 and the phases of the driving currents i1, i2 and i3 are processed so as to be respectively coincided with each other, respectively.

In the above explanations, the power supply circuit 7 is the so-called current control type power supply circuit which generates three-phase driving currents which are respectively proportional to the position signals, p1, p2 and p3 outputted from the waveform generating circuit 6. However, a current which are amplifier that generates currents respectively proportional to the inputted position signals p1, p2 and p3 may easily develop inter-phase variations, thus being disadvantageous in that the circuit structure becomes complex as compared with a simple voltage amplifier. In the case of using the so-called voltage control type power supply circuit which generates three-phases driving voltages which are respectively proportional to the inputted position signals p1, p2 and p3, a phase detecting circuit as shown in FIG. 17 may be employed instead of the phase detecting circuit 10 shown in FIG. 4.

Figure 17:
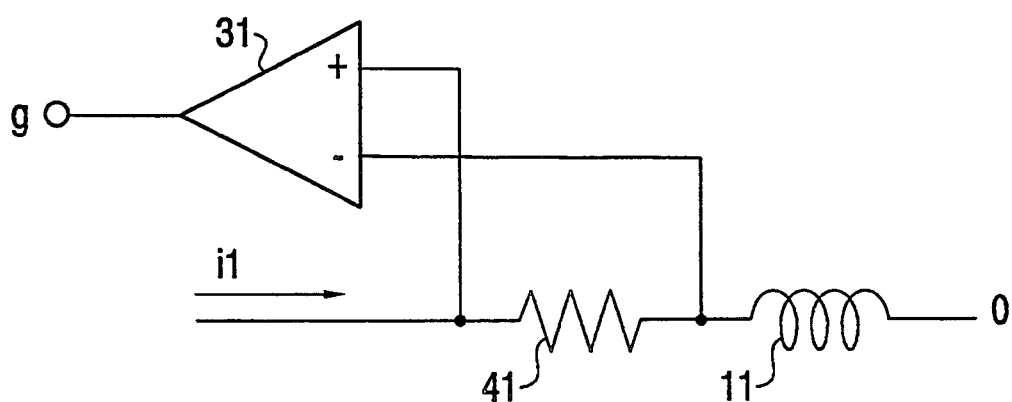
FIG. 17 is a circuit diagram of a phase detecting circuit showing still another example of that shown in FIG. 4.
Figure 18:
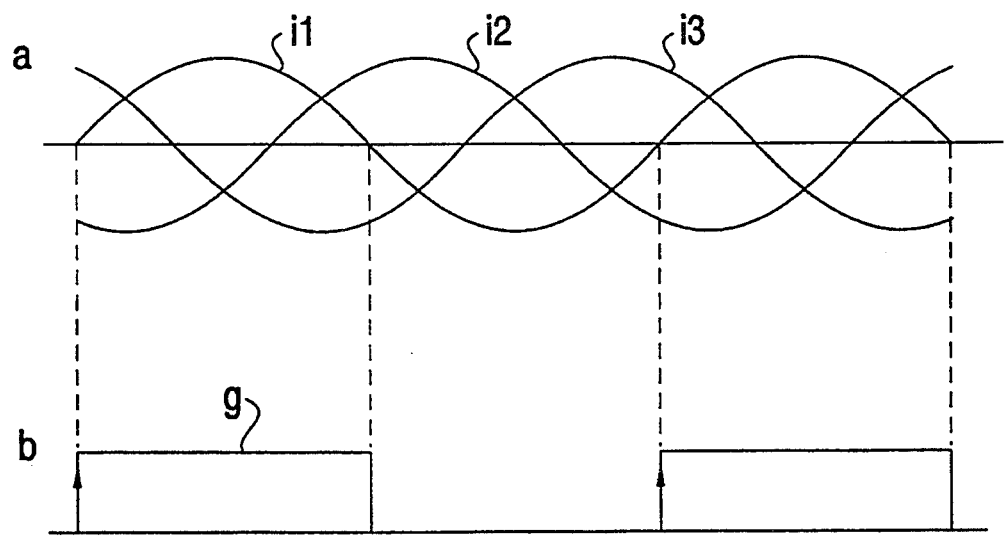
FIG. 18 is a diagram showing a signal waveform of each member of the circuit shown in FIG. 17.

FIG. 17 shows another example of the phase detecting circuit 10 shown in FIG. 1, and FIG. 18 shows a signal waveform of each member of the circuit shown in FIG. 17.

In FIG. 17, element 41 is a resistor for current detection connected in series to one-phase stator winding 11, which converts the phase current i1 outputted to the stator winding 11 into a voltage, and element 42 is a comparator having two input terminals, one connected to each end of the resistor 41. The comparator 42 outputs the phase signal g to the phase adjusting circuit 5 in response to the direction of a current flowing to the resistor 41.

In FIG. 18, waveform a shows a waveform of each of the currents i1, i2 and i3 respectively flowing to three-phase stator windings 11, 12 and 13 when the permanent magnet rotor 20 is being rotated. The current i1 flowing to the stator winding 11 is converted through the resistor 41 into a voltage in accordance with the current itself, and the voltages at the both ends of the resistor 41 are connected respectively to a non-inverting input (+) and an inverting input (−) of the comparator 42, so that the comparator 42 can detect a sign of the phase current flowing to the stator winding 11. As is clear from waveform b shown in FIG. 18, the rising edge of the phase signal g is coincident with the zero crossing point of the current i1. That is, the phase signal g outputted from the phase detecting circuit 10 is to output a timing of the zero crossing point of one phase current of the stator windings 11, 12 and 13, so that the phase detecting circuit 10 can detect the current phase of the stator winding 11.

Here, an explanation as the operation of performing the phase correction so as to cause the phases of the induced currents e1, e2 and e3 to be respectively coincident with the phases of the driving currents i1, i2 and i3 in response to the phase signal g outputted from the phase detecting circuit 10 of this embodiment has been omitted for the sake of avoiding duplication because of being approximately the same as that of the so-called current control type one shown in FIG. 12.

Figure 19:
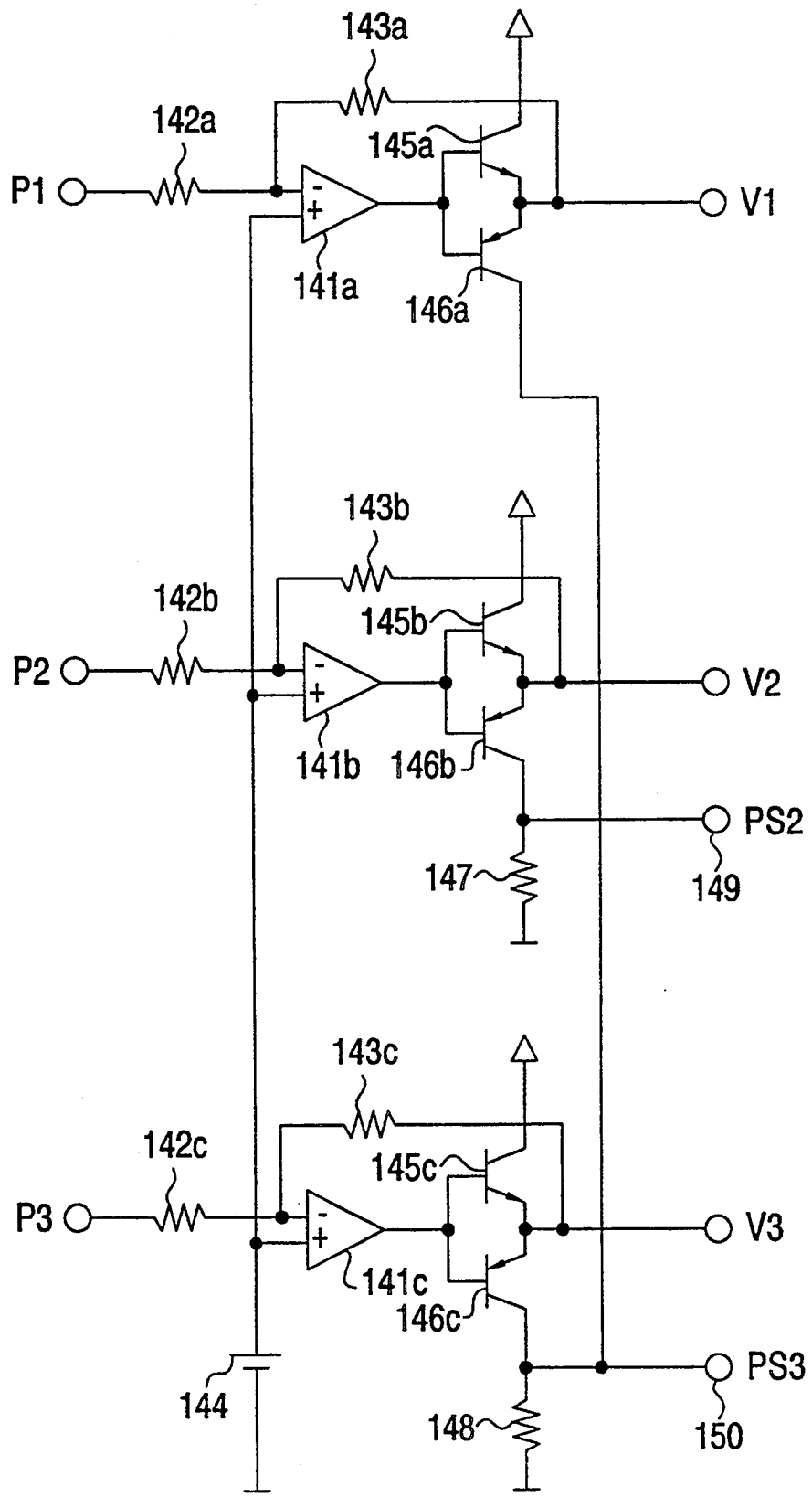
FIG. 19 is a circuit diagram of a power supply circuit showing another example of that shown in FIG. 1.

FIG. 19 shows another example of the power supply circuit 7 shown in FIG. 1, which shows an example of using a voltage amplification circuit.

In FIG. 19, element 141a, 141b and 141c are amplifiers which respectively receive from their inverting input (−) terminals the position signals p1, p2 and p3 outputted from the waveform generating circuit 6 through resistors 142a, 142b and 142c, and which receive a reference voltage 144 from respective non-inverting input (+) terminals. The outputs of the amplifiers 141a, 141b and 141c are connected respectively to the bases of NPN transistors 145a, 145b and 145c and PNP transistors 146a, 146b and 146c, the emitters of which are respectively connected in common. The collectors of the NPN transistors 145a, 145b and 145c are connected respectively to a positive power source, the PNP transistors 146a and 146c are connected through a current detecting resistor 148 to ground (Gnd) and the PNP transistor 146b is connected through a current detecting resistor 147 to Gnd. A signal ps2 and signal ps3 which are obtained by converting the currents into voltages are outputted respectively from a terminal 149 and a terminal 150. In this case, however, the current detecting resistors 147 and 148 are made equal in resistance to each other. In addition, elements 143a, 143b and 143c are feedback resistors which are respectively connected to the common connecting points of the emitters of the NPN transistors and PNP transistors as well as to the inverting input (−) terminals of the amplifiers 141a, 141b and 141c. The outputs ps2 and ps3 from the terminals 149 and 150 are inputted to the phase detecting circuit 100 shown in FIG. 14. In this case, however, the output ps2 is inputted instead of the terminal voltage v2 and the output ps3 is inputted instead of the terminal voltage v3. FIG. 19 is a voltage amplification type power supply circuit, so that the position signals p1, p2 and p3 outputted from the waveform generating circuit 6 are amplified by an amplification factor determined by the ratio of the resistances of the resistors 142 and 143 and the sine-wave voltages thus amplified are applied respectively to the stator windings 11, 12 and 13. As a result, the stator windings 11, 12 and 13 are respectively supplied with the sine-wave driving currents i1, i2 and i3.

Figure 20:
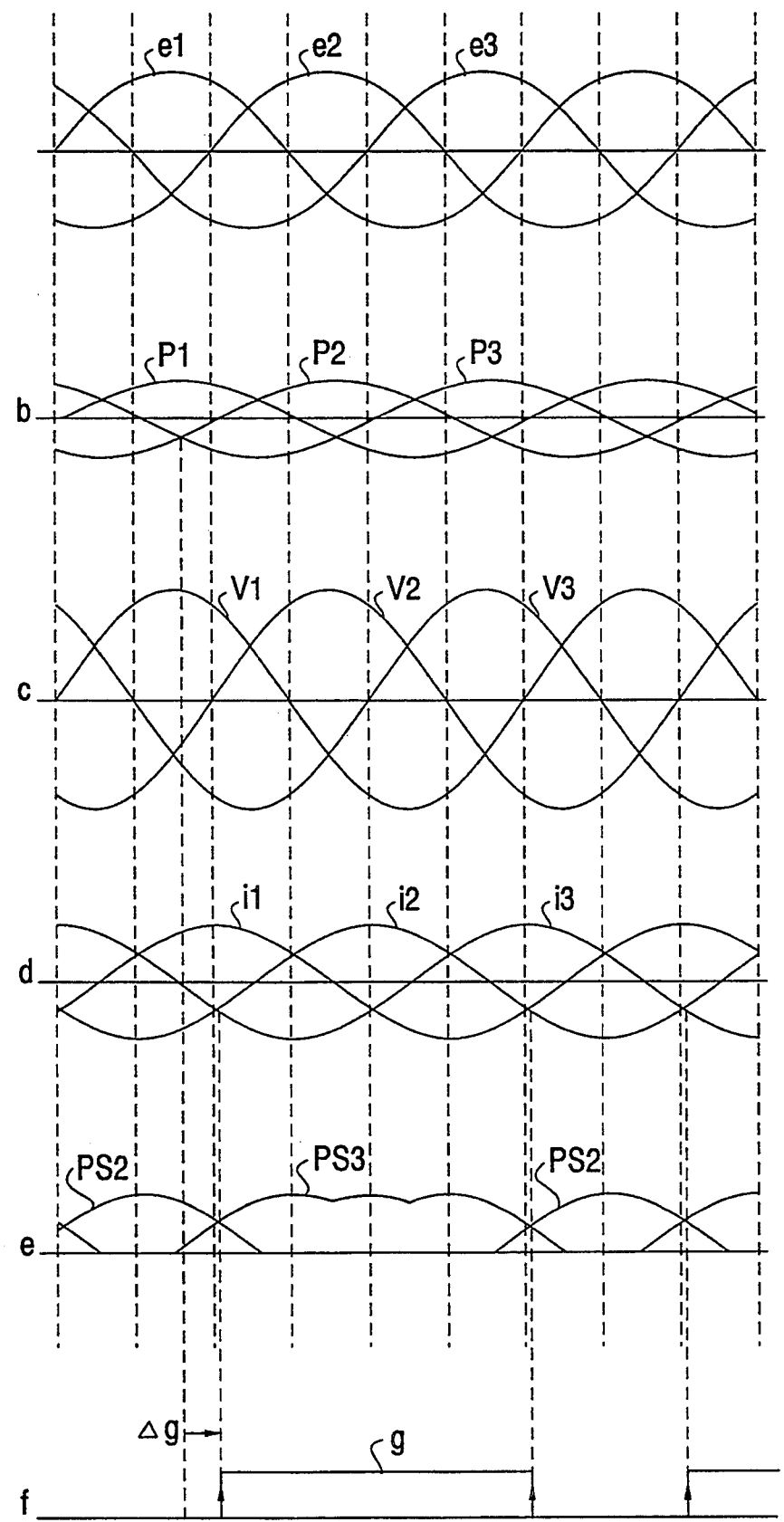
FIG. 20 is a diagram showing a signal waveform of each member of the power supply circuit shown in FIG. 19.

FIG. 20 shows signal waveform of each member of the brushless DC motor shown in FIG. 1 when rotating normally.

Waveform a of FIG. 20 shows the induced currents e1, e2 and e3 respectively induced in the stator windings 11, 12 and 13. Waveform b of FIG. 20 shows the sine-wave position signals p1, p2 and p3 outputted from the waveform generating circuit 6 and waveform c of FIG. 20 shows the terminal voltages v1, v2 and v3 of the respective phases of the stator windings 11, 12 and 13. The position signals p1, p2 and p3 are sine-wave signals, and the power supply circuit 7 shown in FIG. 19 respectively amplifies the voltages of these signals to supply the sine-wave three-phase driving voltages v1, v2 and v3 to the respective phases of the stator windings 11, 12 and 13 and as a result, the position signals p1, p2 and p3 are made respectively coincided in phase with the driving voltages v1, v2 and v3. Waveform c of FIG. 20 shows the currents i1, i2 and i3 outputted to the respective phases of the stator windings 11, 12 and 13, in which currents that are respectively proportional to the differences between the driving voltages v1, v2 and v3 to be supplied and the induced voltages e1, e2 and e3 respectively induced in the stator windings 11, 12 13, or $i = (v - e)/R$ (R=winding resistance) are flow. That is, the signal obtained by combining the voltage drop components due to the winding resistances generated by the driving currents i1, i2 and i3 respectively outputted to the phases of the stator windings 11, 12 and 13 with the induced voltages e1, e2 and e3 respectively induced in the stator windings 11, 12 and 13 are made coincident in phase with the driving voltages v1, v2 and v3 shown in waveform c of FIG. 20.

Waveform f of FIG. 20 shows the signals ps2 and ps3 shown in FIG. 19, in which the signal ps2 is a signal obtained by converting the current of the negative side (sink current) of the current i2 into a voltage, and the signal ps3 is a signal obtained by converting the combined current of respective currents of the negative sides (sink currents) of the currents i3 and i1 into a voltage.

In addition, the fact that the signal ps3 uses the combined current of the respective negative sides of the currents i3 and i1 is because the two signals ps2 and ps3 inputted for comparison to the comparator 100 of the phase detecting circuit 10 shown in FIG. 14 do not become zero simultaneously, being effective to stabilize the operation of the comparator 100.

Waveform f of FIG. 20 shows the phase signal g outputted from the phase detecting circuit 10 shown in FIG. 14, in which the rising edge of the phase signal g is coincident with the maximum peak of the current i1. As is clear from FIG. 20, the rising edge of the phase signal g is shifted in phase by Δg from the maximum peak point of the position signal p1 (or the driving current v1).

The respective signal waveforms of the circuits of the brushless DC motor of this embodiment shown in FIG. 20 are for the case of using a voltage control type power supply circuit 7 in which sine-wave voltages respectively proportional to the position signal are applied to the stator windings. However, the operation of performing the phase correction so as to cause the phases of the induced voltages e1, e2 and e3 to be respectively coincident with the phases of the driving currents i1, i2 and i3 in response to the phase signal g outputted from the phase detecting circuit 10 is approximately equal to that of the case of using the current control type power supply shown in FIG. 16 and as a result, an explanation thereof has been omitted here for the sake of avoiding duplication.

As described above, the brushless DC motor of this invention generates three-phase position signals using the two-phase frequency signals which are different in phase from each other outputted from the frequency generator, which means that a position sensor such as a Hall Effect sensor does not need to be used.

In addition, in the waveform generating circuit 6 shown in FIG. 1, the sine-wave function digital data table for only one period is stored into the memory, and by referring to the function table by changing the address value by a different amount of phase, the digital three-phase position signals are outputted respectively to the three digital/analog converters 63, 64 and 65, but are not limited thereto, and one digital/analog converter could be used to convert the digital values into analog values in a sequential manner, and the analog values thus obtained can be held respectively in three sample and hold circuits (not shown), thereby outputting them as their three-phase position signals. Also, the sine-wave function is a symmetrical periodic function and as a result, it is not necessary to store all of one period part in the function table, which means that only ½ period part or ¼ period part may be stored in the function table and the remaining part may be processed appropriately according to the address value so as to thereby obtain the digital values equivalent to the three-phase position signals. This is advantageous in that the memory necessary for the function table can be made small. In addition, only the function table for only one period is not stored in the memory, but the sine-wave functions for the three phases are stored in respective function tables and the digital values equivalent to the three-phase position signals are respectively outputted directly to the digital/analog converters 63, 64 and 65.

Further in addition, the motor to be used is a three-phase motor one, but the present invention is not limited thereto; a motor that has any number of phases can be used for this purpose. Also, many modifications are made possible without changing the main objects of this invention.

We claim:

1. A brushless DC motor comprising:
    a rotor having a plurality of magnetic poles;
    plural-phase windings disposed adjacent to said rotor;
    a frequency generator, said generator generating plural-phase frequency signals, each signal having a frequency proportional to a rotational speed of said rotor;
    a direction detector, said detector detecting a rotational direction of said rotor from said plural-phase frequency signals to obtain a direction signal;
    a counter, said counter counting pulses of at least one frequency signal of said plural-phase frequency signals in response to said direction signal;
    a detector, said detector outputting a phase signal in response to a phase of one of a voltage and a current of at least one of said plural-phase stator windings;
    an adjuster, said adjuster adjusting a count value of said counter by one of adding thereto and subtracting therefrom a predetermined value in response to a rotational direction command and performing a phase adjustment in response to said phase signal to obtain a command value;
    a generator, said generator generating plural-phase waveform signals in response to said command value; and
    a power supply, said power supply supply one of driving currents and driving voltages to the plural-phase stator windings in response to said plural-phase waveform signals.

2. A brushless DC motor as claimed in claim 1, wherein said phase detector compares one of at least two-phase voltages and two-phase currents supplied to the plural-phase stator windings to obtain said phase signal.

3. A brushless DC motor as claimed in claim 1, wherein said phase detector compares a current outputted to one phase of the stator windings with a sum of currents outputted to the other phases of the stator windings to obtain said phase signal.

4. A brushless DC motor as claimed in claim 1, wherein said phase adjuster adjusts the count value of said counter in response to a phase signal when a phase difference between a voltage and a current of said stator windings exceeds a predetermined value.

5. A brushless DC motor as claimed in claim 1, wherein said phase adjuster one of adds and subtracts a predetermined value to or from the count value of said counter in response to the rotational direction command so as to rotate a phase of a rotating magnetic field generated by said stator windings by 90° in terms of electrical angle from a phase of a magnetic pole of said rotor.

6. A brushless DC motor as claimed in claim 1, wherein said waveform generator comprises:
    a memory having digital data stored therein representing a sine-wave signal; and
    a digital/analog converter, said converter converting digital data read from said memory into an analog value.

7. A brushless DC motor as claimed in claim 6, wherein said waveform generator has digital data stored therein representing only one period of said sine-wave signal.

8. A brushless DC motor as claimed in claim 6, wherein said waveform generator has digital data stored therein representing one of a half period and a quarter period of said sine-wave signal.

9. A brushless DC motor as claimed in claim 1, wherein said counter, phase adjuster and waveform generator include:
    a first memory, said first memory having a first program for counting said pulses; and
    a first operational processor, said first processor performing processes in accordance with said first program.

10. A brushless DC motor comprising:
    a rotor having a plurality of magnetic poles;
    plural-phase stator windings disposed adjacent to said rotor;
    a frequency generator, said generator generating plural-phase frequency signals, each signal having a frequency proportional to a rotational speed of said rotor;
    a direction detector, said detector detecting a rotational direction of said rotor from said plural-phase frequency signals to obtain a direction signal;
    a counter, said counter counting pulses of at least one frequency signal of said plural-phase frequency signals in response to said direction signal;
    an initial position detector, said detector computing an initial value of said rotor from a count value of said counter and outputting said initial value to said counter;
    a phase detector, said detector outputting a phase signal in response to a phase of one of a voltage and a current of at least one of said plural-phase stator windings;
    a phase adjuster, said adjuster adjusting the count value of said counter by one of adding thereto and subtracting therefrom a predetermined value in response to a rotational direction command and performing a phase adjustment in response to said phase signal to obtain a command value;
    a generator, said generator generating plural-phase waveform signals in response to said command value; and
    a power supply, said power supply respectively supplying one of driving currents and driving voltages to the plural-phase stator windings in response to said plural-phase waveform signals.

11. A brushless DC motor as claimed in claim 10, wherein said phase detector compares at least one of two-phase voltages and two-phase currents supplied to the plural-phase stator windings to obtain said phase signal.

12. A brushless DC motor as claimed in claim 10, wherein said phase detector compares a current outputted to one phase of the stator windings with a sum of currents outputted to the other phases of the stator windings to obtain said phase signal.

13. A brushless DC motor as claimed in claim 10, wherein said initial position detector detects a first count value of said counter by rotating a magnetic field clockwise and a second count value of said counter by rotating the magnetic field counterclockwise and calculates an average value of said first count value and second count value as the initial value of said counter.

14. A brushless DC motor as claimed in claim 10, wherein said initial position detector operates only when starting said motor.

15. A brushless DC motor as claimed in claim 10, wherein said phase adjuster adjusts the count value of said counter in response to the phase signal when a phase difference between a voltage and a current of said stator windings exceeds a predetermined value.

16. A brushless DC motor as claimed in claim 10, wherein said phase adjuster one of adds and subtracts a predetermined value to or from the count value of said counter in response to the rotational direction command so as to rotate a phase of a rotating magnetic field generated by said stator windings by 90° in terms of electrical angle from a phase of a magnetic pole of said rotor.

17. A brushless DC motor as claimed in claim 10, wherein said waveform generator comprises:
- a memory having digital data stored therein representing a sine-wave signal; and
- a digital/analog converter, said converter converting digital data read from said memory into an analog value.

18. A brushless DC motor as claimed in claim 17, wherein said waveform generator has digital data stored therein representing only one period of said sine-wave signal.

19. A brushless DC motor as claimed in claim 17, wherein said waveform generator has digital data stored therein representing one of a half period and a quarter period of said sine-wave signal.

20. A brushless DC motor as claimed in claim 10, wherein said initial position detector, counter, phase adjuster and waveform generator include:
- a first memory having a first program for counting said pulses; and
- a first operational processor, said processor performing processes in accordance with said first program.

21. A brushless DC motor as claimed in claim 1, wherein said phase adjuster includes:
- a second memory having a second program for adjusting said count value of said counter; and
- a second operational processor, said processor performing processes in accordance with said second program.

22. A brushless DC motor as claimed in claim 1, wherein said waveform generator includes:
- a third memory having a third program for generating said plural-phase waveform signals; and
- a third operational processor, said processor performing processes in accordance with said third program.

23. A brushless DC motor as claimed in claim 10, wherein said phase adjuster includes:
- a second memory having a second program for adjusting said count value of said counter; and
- a second operational processor, said processor performing processes in accordance with said second program.

24. A brushless DC motor as claimed in claim 10, wherein said waveform generator includes:
- a third memory having a third program for generating said plural-phase waveform signals; and
- a third operational processor, said processor performing processes in accordance with said third program.

25. A brushless DC motor as claimed in claim 10, wherein said initial position detector includes:
- a fourth memory having a fourth program for computing said initial value of said rotor; and
- a fourth operational processor, said processor performing processes in accordance with said fourth program.

* * * * *